United States Patent
Li et al.

(10) Patent No.: US 12,289,613 B2
(45) Date of Patent: Apr. 29, 2025

(54) IN-VEHICLE MACHINE LEARNING SERVICE

(71) Applicant: QUALCOMM Incorporated, San Diego, CA (US)

(72) Inventors: Qing Li, Princeton Junction, NJ (US); Kapil Gulati, Belle Mead, NJ (US); Hong Cheng, Basking Ridge, NJ (US); Kyle Chi Guan, New York, NY (US); Himaja Kesavareddigari, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 601 days.

(21) Appl. No.: 17/649,763

(22) Filed: Feb. 2, 2022

(65) Prior Publication Data

US 2023/0308892 A1  Sep. 28, 2023

(51) Int. Cl.
*H04W 16/28* (2009.01)
*H04W 24/10* (2009.01)
*H04W 76/10* (2018.01)
*H04W 76/20* (2018.01)
*H04W 92/18* (2009.01)

(52) U.S. Cl.
CPC ........... *H04W 16/28* (2013.01); *H04W 24/10* (2013.01); *H04W 76/10* (2018.02); *H04W 76/20* (2018.02); *H04W 92/18* (2013.01)

(58) Field of Classification Search
None
See application file for complete search history.

(56) References Cited

U.S. PATENT DOCUMENTS

| | | | | |
|---|---|---|---|---|
| 11,257,002 | B2* | 2/2022 | Faulhaber, Jr. | G06N 3/08 |
| 2015/0379426 | A1* | 12/2015 | Steele | G06N 5/025 |
| | | | | 706/12 |
| 2016/0078361 | A1* | 3/2016 | Brueckner | H04L 67/10 |
| | | | | 706/12 |
| 2019/0303726 | A1* | 10/2019 | Côté | G06N 20/20 |
| 2020/0034742 | A1* | 1/2020 | Dirac | G06N 20/00 |
| 2020/0050968 | A1* | 2/2020 | Lee | G06N 20/00 |
| 2020/0128101 | A1* | 4/2020 | Meng | G01C 21/36 |
| 2022/0239758 | A1* | 7/2022 | Klein | G06N 20/00 |
| 2022/0366311 | A1* | 11/2022 | Meehan | G06N 20/00 |

* cited by examiner

*Primary Examiner* — Phirin Sam
(74) *Attorney, Agent, or Firm* — Procopio, Cory, Hargreaves & Savitch LLP

(57) ABSTRACT

Aspects presented herein may enable wireless communications to be adaptive to a dynamic environment, where wireless devices may manage wireless communications, such as performing beam managements, based at least in part on environmental conditions. In one aspect, a network entity receives, from a sensor device or a UE, a request for an ML data service. The network entity establishes, with the sensor device or the UE, the ML data service based on the request. The network entity receives, from the sensor device, ML data including a set of features extracted from at least one sensor of the sensor device or information indicative of at least one beam for the ML data service. The network entity transmits, to the UE, a beam indication to modify the at least one beam based at least in part on the ML data received from the sensor device during the ML data service.

30 Claims, 18 Drawing Sheets

IN-VEHICLE MACHINE LEARNING SERVICE

TECHNICAL FIELD

The present disclosure relates generally to communication systems, and more particularly, to wireless communication involving machine learning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives, from a user equipment (UE) communicating with a network entity, a first indication for a machine learning (ML) data service, the ML data service being associated with at least one of an ML training data service or an ML inference data service. The apparatus transmits, to the network entity, a request for the ML data service based at least in part on the first indication. The apparatus establishes, with the network entity, the ML data service based on the request. The apparatus transmits, to the network entity, ML data including a set of features extracted from the at least one sensor or information indicative of at least one beam for the ML data service.

In an aspect of the disclosure, a method, a computer-readable medium, and an apparatus are provided. The apparatus receives, from a sensor device comprising at least one sensor, a first indication for an ML data service, the ML data service being associated with at least one of an ML training data service or an ML inference data service. The apparatus transmits, to a network entity communicating with the UE, a request for the ML data service based at least in part on the indication. The apparatus receives, from the network entity, an acceptance to establish the ML data service based on the request. The apparatus transmits, to the sensor device, information indicative of at least one beam for the ML data service. The apparatus receives, from the network entity, a beam indication to modify the at least one beam during the ML data service.

In an aspect of the disclosure, a method, a computer-readable medium, and an apparatus are provided. The apparatus receives, from a sensor device or a UE, a request for an ML data service. The apparatus establishes, with the sensor device or the UE, the ML data service based on the request. The apparatus receives, from the sensor device, ML data including a set of features extracted from at least one sensor of the sensor device or information indicative of at least one beam for the ML data service. The apparatus transmits, to the UE, a beam indication to modify the at least one beam based at least in part on the ML data received from the sensor device during the ML data service.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
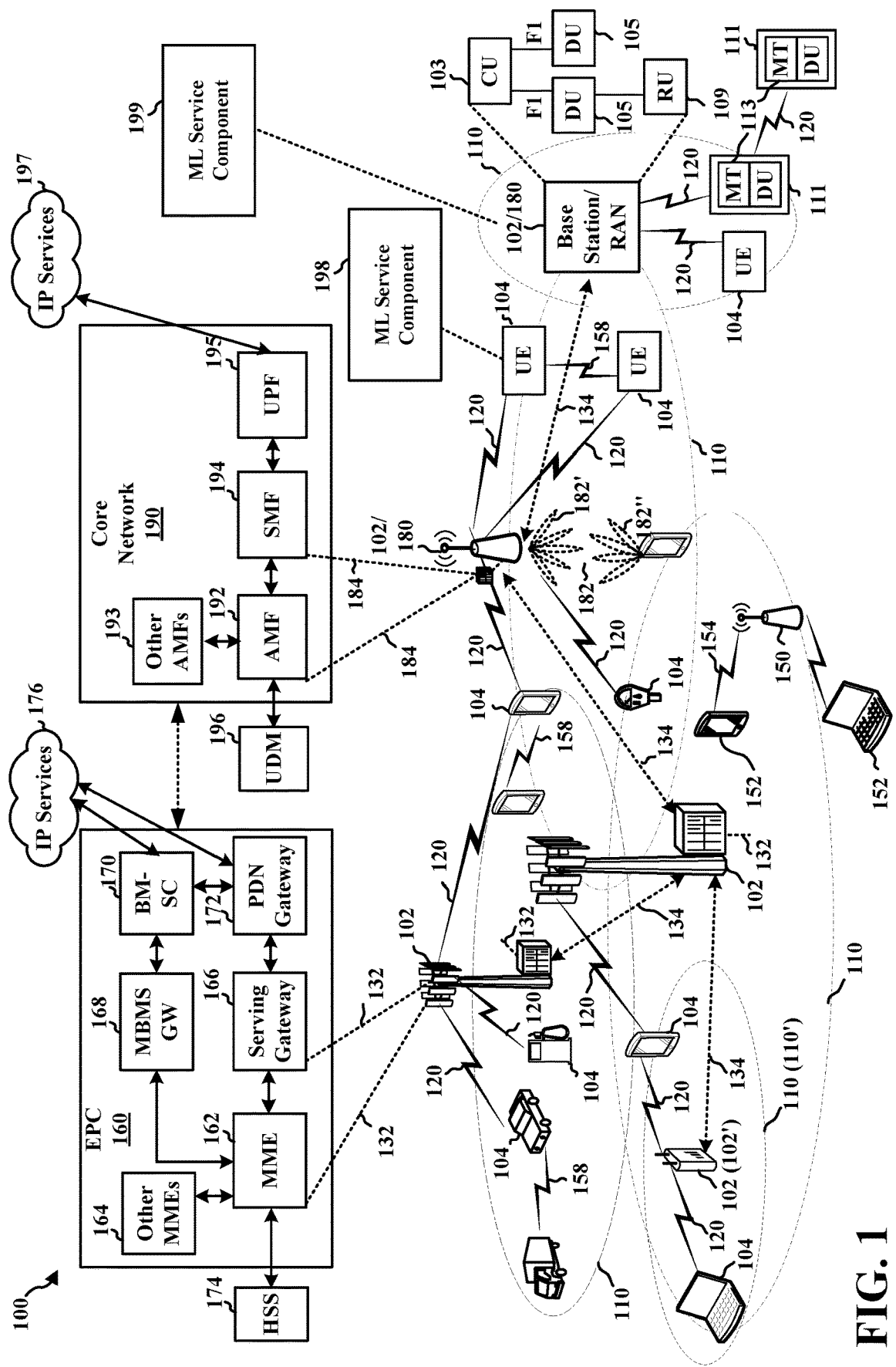
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented herein may improve the performance and reliability of wireless communications operating at higher frequency bands, such as millimeter wave bands. Aspects presented herein may enable wireless communications to be adaptive to a dynamic environment, where wireless devices may manage wireless communications, such as performing beam managements, based at least in part on environmental conditions. For example, in one aspect of the present disclosure, to overcome rapid variations of the link quality of wireless communication systems operating at higher frequency bands caused by a line-of-sight (LOS) path blockage, sensing information provided by a vehicle's onboard sensor(s) (e.g., camera(s), radar(s), and/or light detection and ranging (lidar) sensors) may be leveraged to provide information associated with communication environments as well as obstacles (e.g., moving objects) that may potentially block the LOS path and degrade the communication quality for a wireless device, such as a UE. The vehicle may include motor vehicles (e.g., motorcycles, cars, trucks, and buses), railed vehicles (trains and trams, etc.), watercrafts (ships and boats), and/or aircrafts (e.g., airplanes, helicopters, and aerostat), etc. In addition, in another aspect of the present disclosure, a vehicle may be configured to employ onboard computation resources and machine learning (ML) models to pre-process collected sensor data and feed inference data to an inference host collocated/associated with a base station (e.g., a gNB) for predicting/estimating possible blockages (e.g., LOS path blockages) or best beam pairs so that the base station may proactively initiate beam management or hand-off procedures for a UE.

In certain aspects, the UE 104 (e.g., a vehicle UE) may include an ML service component 198 configured to provide sensing information based on its sensors to a base station or an ML service component 199 associated with the base station for improving the communication between the base station and another UE (e.g., an in-vehicle UE) that may be in proximity with the sensor device. The base station or the ML service component 199 may include an ML training host for ML model training, an ML inference host for ML inference, or both. In some examples, the ML service component 198 may initiate an ML service for another UE (e.g., as described in connection with FIG. 10 for sensor data collector/vehicle initiated ML data service). In one configuration, the ML service component 198 may receive, from a UE communicating with a network entity, a first indication for an ML data service, the ML data service being associated with at least one of an ML training data service or an ML inference data service. In such configuration, the ML service component 198 may transmit, to the network entity, a request for the ML data service based at least in part on the first indication. In such configuration, the ML service component 198 may establish, with the network entity, the ML data service based on the request. In such configuration, the ML service component 198 may transmit, to the network entity, ML data including a set of features extracted from the at least one sensor or information indicative of at least one beam for the ML data service.

In certain aspects, the UE 104 (e.g., an end user UE, an in-vehicle UE, etc.) may include the ML service component 198 configured to improve the UE 104's communication with a base station by leveraging sensing information provided by a sensor device (or another UE, such as a vehicle UE) that is in proximity with ML service component 198. In some examples, the ML service component 198 may initiate the ML service for the UE 104 (e.g., as described in connection with FIG. 11 for UE initiated ML data service). In one configuration, the ML service component 198 may receive, from a sensor device comprising at least one sensor, a first indication for an ML data service, the ML data service being associated with at least one of an ML training data service or an ML inference data service. In such configuration, the ML service component 198 may transmit, to a network entity communicating with the UE, a request for the ML data service based at least in part on the indication. In such configuration, the ML service component 198 may receive, from the network entity, an acceptance to establish the ML data service based on the request. In such configuration, the ML service component 198 may transmit, to the sensor device, information indicative of at least one beam for the ML data service. In such configuration, the ML service component 198 may receive, from the network entity, a beam indication to modify the at least one beam during the ML data service.

In certain aspects, a network entity, which may be a radio access network (RAN) that includes the base station 102/180 or a component of the RAN or the base station 102/180, may include an ML service component 199 configured to improve its communication with a UE by leveraging sensing information provided by a sensor device that is in proximity with the UE. The network entity may include or associated with at least one of an ML training host or an ML inference host. In one configuration, the ML service component 199 may receive, from a sensor device or a UE, a request for an ML data service. In such configuration, the ML service component 199 may establish, with the sensor device or the UE, the ML data service based on the request. In such configuration, the ML service component 199 may receive, from the sensor device, ML data including a set of features extracted from at least one sensor of the sensor device or information indicative of at least one beam for the ML data service. In such configuration, the ML service component 199 may transmit, to the UE, a beam indication to modify the at least one beam based at least in part on the ML data received from the sensor device during the ML data service.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a base station 102 or 180 may be referred as a RAN and may include aggregated or disaggregated components. As an example of a disaggregated RAN, a base station may include a central/centralized unit (CU) 103, one or more distributed units (DU) 105, and/or one or more radio units (RU) 109, as illustrated in FIG. 1. A RAN may be disaggregated with a split between an RU 109 and an aggregated CU/DU. A RAN may be disaggregated with a split between the CU 103, the DU 105, and the RU 109. A RAN may be disaggregated with a split between the CU 103 and an aggregated DU/RU. The CU 103 and the one or more DUs 105 may be connected via an F1 interface. A DU 105 and an RU 109 may be connected via a fronthaul interface. A connection between the CU 103 and a DU 105 may be referred to as a midhaul, and a connection between a DU 105 and an RU 109 may be referred to as a fronthaul. The connection between the CU 103 and the core network may be referred to as the backhaul. The RAN may be based on a functional split between various components of the RAN, e.g., between the CU 103, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 103 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 103 and a DU 105. IAB nodes 111 may include a DU 105 and a mobile termination (MT) 113. The DU 105 of an IAB node 111 may operate as a parent node, and the MT 113 may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
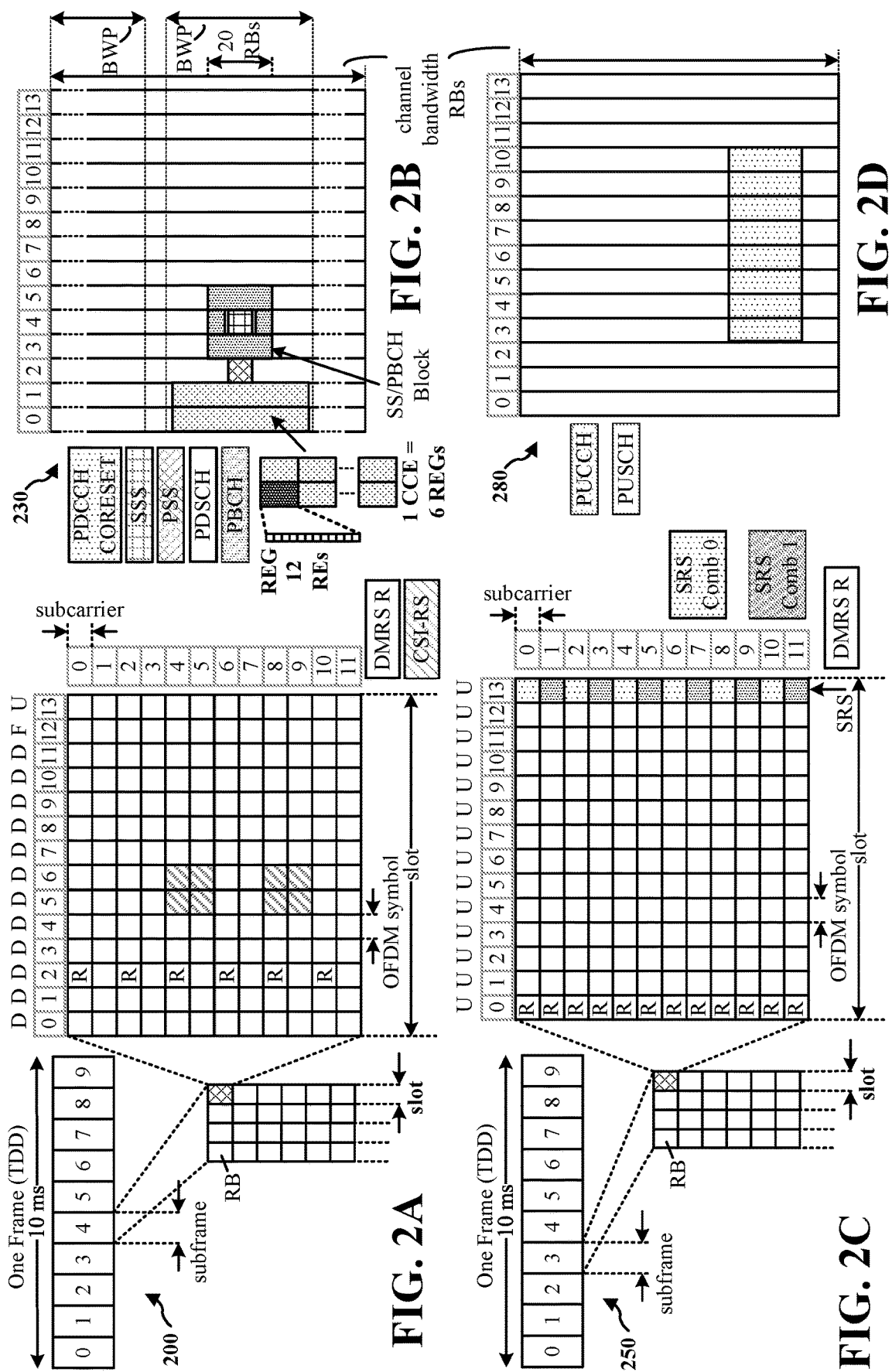
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>$\Delta f = 2^\mu \cdot 15$ [KHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology p, there are 14 symbols/slot and 2 slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
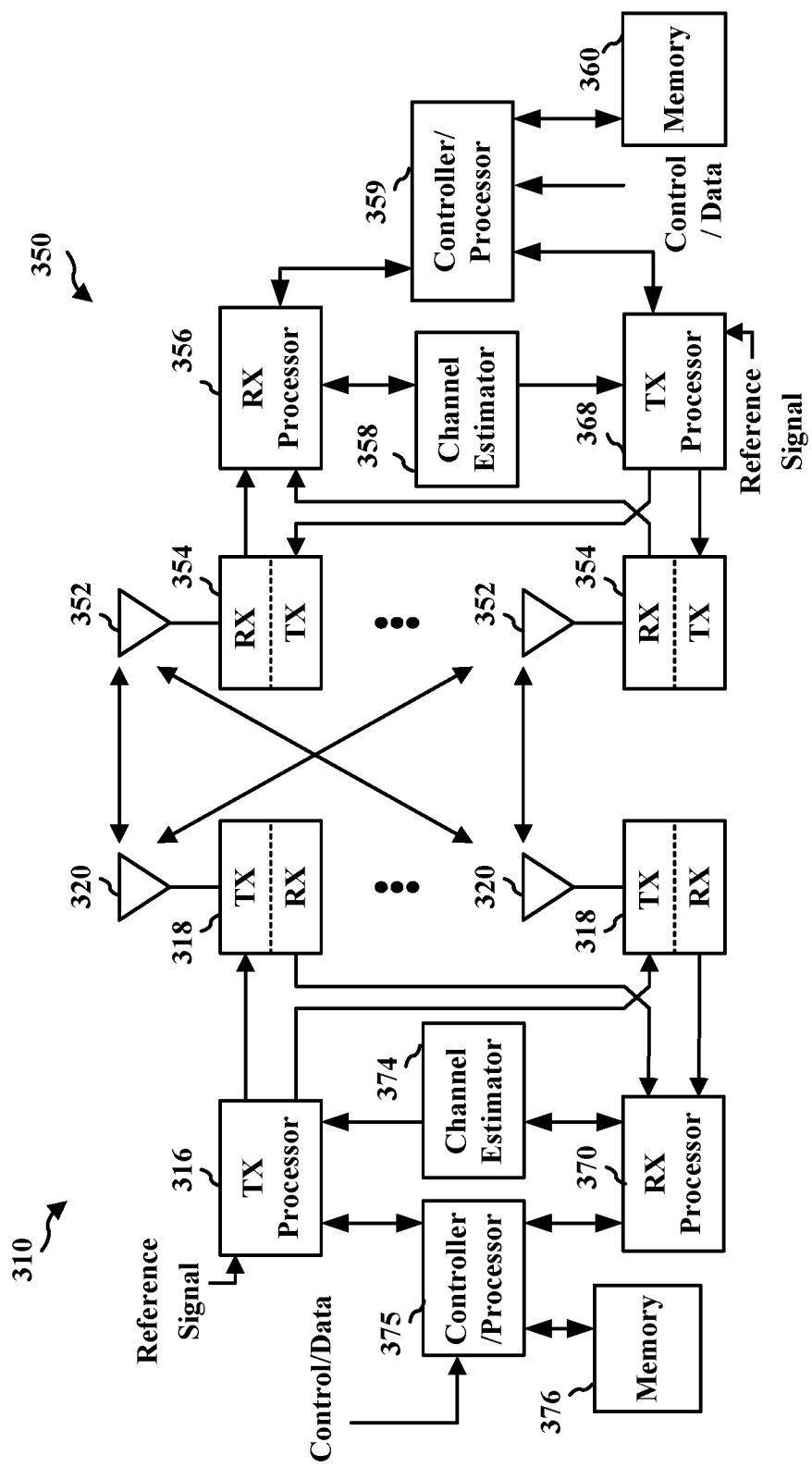
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the ML service component 198 of FIG. 1.

At least one of the TX processor 316, the RX processor 370, and the controller/processor 375 may be configured to perform aspects in connection with the ML service component 199 of FIG. 1.

Wireless networks may operate at higher frequency bands, such as within millimeter wave (mmW) bands (e.g., FR2 above 28 GHz, FR4 above 60 GHz, or THz band above 100 GHz, etc.), to offer potentially data rates of several tens or hundreds of Gbit/s. For example, wireless devices, such as a base station and UEs, may communicate with each other through beamforming techniques to increase communication speed and reliability. The beamforming techniques may enable a wireless device to transmit a signal towards a particular direction instead of transmitting an omnidirectional signal in all directions. In some examples, the wireless device may transmit a signal from multiple antenna elements using a common wavelength and phase for the transmission from the multiple antenna elements, and the signal from the multiple antenna elements may be combined to create a combined signal with a longer range and a more directed beam. The beamwidth of the signal may vary based on the transmitting frequency. For example, the width of a beam may be inversely related to the frequency, where the beamwidth may decrease as the transmitting frequency increases because more radiating elements may be placed per given area at a transmitter due to smaller wavelength. As such, higher frequency bands (e.g., THz or sub-THz frequency bands) may enable wireless devices to form much narrower beam structures (e.g., pencil beams, laser beams, etc.) compared to the beam structures under the FR2 or below because more radiating elements may be placed per given area at the antenna element due to smaller wavelength. The higher frequency bands may have short delay spread (e.g., few nanoseconds) and may be translated into coherence frequency bandwidth of tens (10s) of MHz. In addition, the higher frequency bands may provide an enormous available bandwidth, which may be occupied by larger bandwidth carriers, such as 1000 MHz per carrier or above. In some examples, the transmission path of a narrower beam may be more likely to be tailored to a receiver, such that the transmission may be more likely to meet a line-of-sight (LOS) condition as the narrower beam may be more likely to reach the receiver without being obstructed by obstacle(s). Also, as the transmission path may be narrow, reflection and/or refraction may less likely to occur for the narrower beam.

While higher frequency bands may provide narrower beam structures and higher transmission rates, higher frequency bands may also encounter higher attenuation and diffraction losses, where a blockage of an LOS path may profoundly degrade a wireless link quality. For example, when two wireless devices are communicating with each other based on a LOS path at a higher frequency band and the LOS path is blocked by an obstacle, such as pedestrians, buildings, vehicles, etc., the received power may drop significantly. As such, wireless communications based on higher frequency bands may be more susceptible to environmental changes compared to lower frequency bands.

Aspects presented herein may improve the performance and reliability of wireless communications operating at higher frequency bands, such as millimeter wave bands. Aspects presented herein may enable wireless communications to be adaptive to a dynamic environment, where wireless devices may manage wireless communications, such as performing beam managements, based at least in part on environmental conditions. For example, in one aspect of the present disclosure, to overcome rapid variations of the link quality of wireless communication systems operating at higher frequency bands caused by an LOS path blockage, sensing information provided by a vehicle's onboard sensor(s) (e.g., camera(s), radar(s), and/or light detection and ranging (lidar) sensors) may be leveraged to provide information associated with communication environments as well as obstacles (e.g., moving objects) that may potentially block the LOS path and degrade the communication quality for a wireless device, such as a UE. The vehicle may include motor vehicles (e.g., motorcycles, cars, trucks, and buses), railed vehicles (trains and trams, etc.), watercrafts (ships and boats), and/or aircrafts (e.g., airplanes, helicopters, and aerostat), etc. In addition, in another aspect of the present disclosure, a vehicle may be configured to employ onboard computation resources and machine learning (ML) models to pre-process collected sensor data and feed inference data to an inference host collocated/associated with a base station (e.g., a gNB) for predicting/estimating possible blockages (e.g., LOS path blockages) or best beam pairs so that the base station may proactively initiate beam management or hand-off procedures for a UE. For purposes of the present disclosure, an "inference" or an "ML inference" may refer to a process of running data points into an ML model (e.g., via an inference host) to calculate an output such as a single numerical score, e.g., to use a trained ML algorithm to make a prediction. An "inference host" or an "ML inference host" may refer to a network function which hosts the ML model during an inference mode (described in details in connection with FIGS. 4 and 5). Alternately, in another aspect of the present disclosure, a vehicle (e.g., a vehicle UE) may be configured to employ onboard computation resources and ML models to pre-process collected sensor data and feed training data to an ML training host collocated/associated with a base station (e.g., a gNB) for offline and/or online training ML models for predicting/estimating possible blockages (e.g., LOS path blockages) or best beam pairs. For purposes of the present disclosure, an "training" or an "ML training" may refer to a process of running data points to train or teach an ML model (e.g., via a training host). A "training host" or an "ML training host" may refer to a network function which hosts the ML model during a training mode (described in details in connection with FIGS. 4 and 5).

Figure 4:
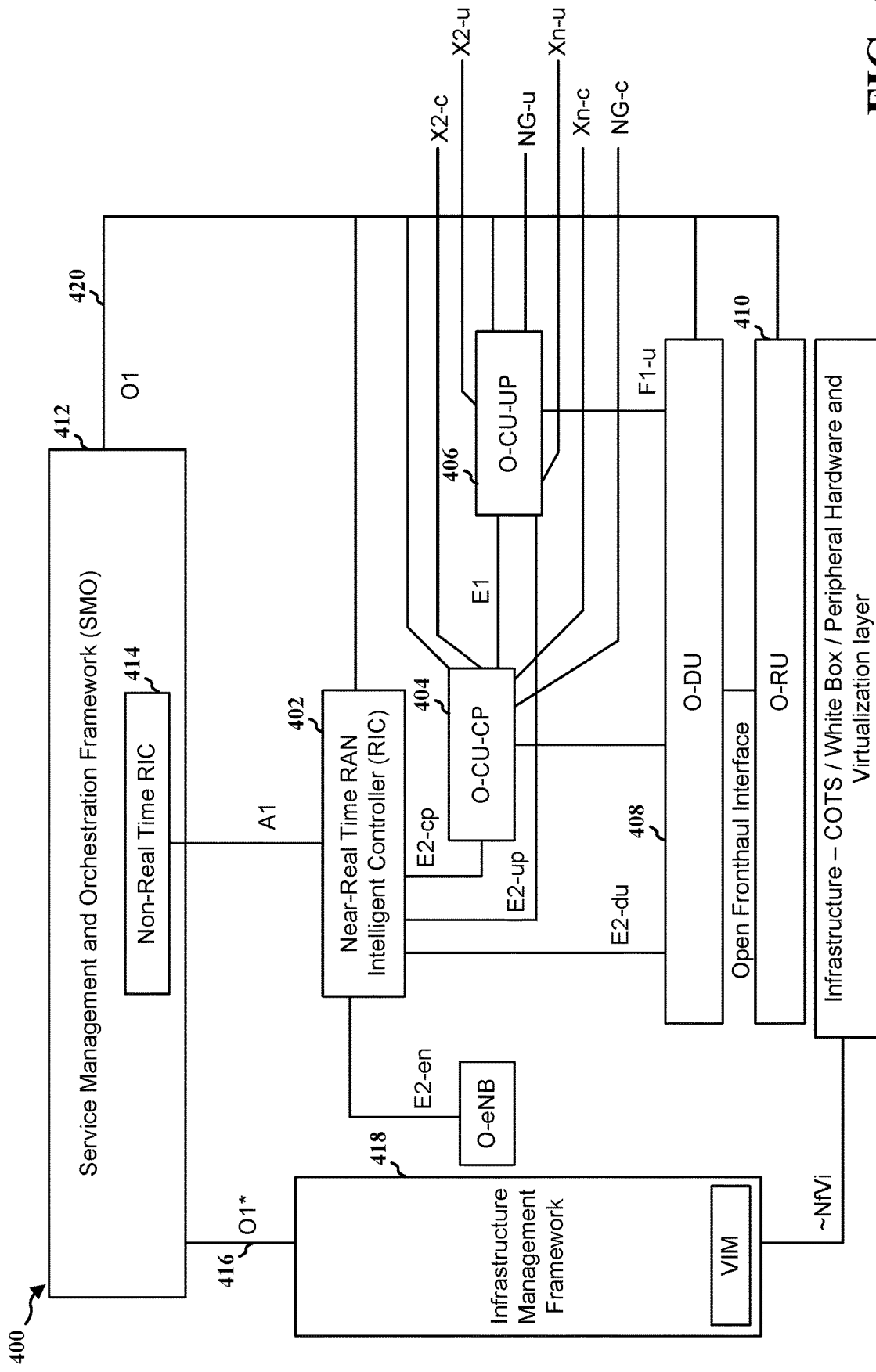
FIG. 4 is a diagram illustrating an example of an open radio access network (O-RAN) architecture implemented with a RAN intelligence controller (RIC) which may be used as an inference host in accordance with various aspects of the present disclosure.

FIG. 4 is a diagram 400 illustrating an example of an open radio access network (O-RAN) architecture implemented with a RAN intelligence controller (RIC) which may be used as an ML training host or an ML inference host in accordance with various aspects of the present disclosure. As described in connection with FIG. 1, a RAN (e.g., a base station) may be disaggregated into multiple components/elements, such as a CU (e.g., the CU 103), multiple DUs (e.g., DU 105), and multiple RUs (e.g., RU 109), etc. Similarly, the O-RAN shown by the diagram 400 may also be disaggregated into multiple components/elements. For example, the radio side of an O-RAN architecture (e.g., the components for performing wireless communication) may include a near-real time (near-RT) RIC 402, an O-RAN-central unit-control plane (O-CU-CP) 404, an O-RAN-central unit-user plane (O-CU-UP) 406, an O-RAN distributed unit (O-DU) 408 (which may also be referred to as an open distributed unit), and an O-RAN radio unit (O-RU) 410 (which may also be referred to as an open radio unit). The management side of the O-RAN architecture (e.g., the components for performing communication managements) may include a service management and orchestration framework 412 that contains a non-real time (non-RT) RIC 414 function.

In some examples, the near-RT RIC 402 may be a logical function that enables near-real-time control and optimization of O-RAN elements and resources via fine-grained data collection and actions over an E2 interface. The near-RT RIC 402 may be collocated with the RAN/base station (e.g., the O-CU-CP 402) to provide the real-time processing, such as online ML training or near real time ML inference. The non-RT RIC 414 may be a logical function that enables non-real-time control and optimization of RAN elements and resources, artificial intelligence (AI)/ML workflow including model training and updates, and policy-based guidance of applications/features in near-RT RIC, as well as ML inference with less latency specification. The non-RT RIC 414 may be located further from the RAN/base station, such as on a cloud-based server or on an edge server. The O-CU-CP 404 and the O-CU-UP 406 (collectively as "O-CU") may be a logical node hosting radio resource control (RRC), service data adaptation protocol (SDAP) and packet data convergence protocol (PDCP) protocols. For example, the O-CU-CP 404 may be a logical node hosting the RRC and the control plane part of the PDCP protocol, whereas the O-CU-UP 406 may be a logical node hosting the user plane part of the PDCP protocol and the SDAP protocol. The O-DU 408 may be a logical node hosting radio link control (RLC), medium access element (MAC), and/or high-physical (PHY) layers based on a lower layer functional split. The O-RU 410 may be a logical node hosting low-PHY layer and radio frequency (RF) processing based on a lower layer functional split. The O-RAN may include an O1 interface 420 between management entities in the service management and orchestration framework 412 and O-RAN managed elements (e.g., near-RT RIC, O-CU, O-DU, O-RU, etc.), for operation and management, by which fault, configuration, accounting, performance and security (FCAPS) management, software management, file management are to be achieved. The O-RAN may also include an O1* interface 416 between the service management and orchestration framework 412 and an infrastructure management framework 418 supporting O-RAN virtual network functions.

In one aspect, the O-RAN may define an overall RIC architecture that consists of four functional software elements: a DU software function, a multi-radio access technology (RAT) CU protocol stack, the near-RT RIC 402 itself, and the orchestration/network management system (NMS) layer with the non-RT RIC 414. The functional software elements may interact with RU hardware to make it run more efficiently and to be optimized real-time as a part of the RAN cluster to deliver a better network experience to end users.

In some examples, the functionality of the non-RT RIC 414 may include configuration management, device management, fault management, performance management, and lifecycle management for all network elements in the network. The non-RT RIC 414 may use data analytics and AI/ML training/inference to determine the RAN optimization actions for which it may leverage services of the service management and orchestration framework 412 such as data collection and provisioning services of the O-RAN nodes. On the other hand, the near-RT RIC 402 may use embedded intelligence for per-UE controlled load-balancing, resource block (RB) management, interference detection, and mitigation, etc. This may also provide quality of service (QoS) management, connectivity management, and/or seamless handover control, etc. The near-RT RIC 402 may leverage the near real-time state of the underlying network and feed RAN data to train the AI/ML models, which may then feed to the near-RT RIC 414 to facilitate radio resource management for subscribers.

Figure 5:
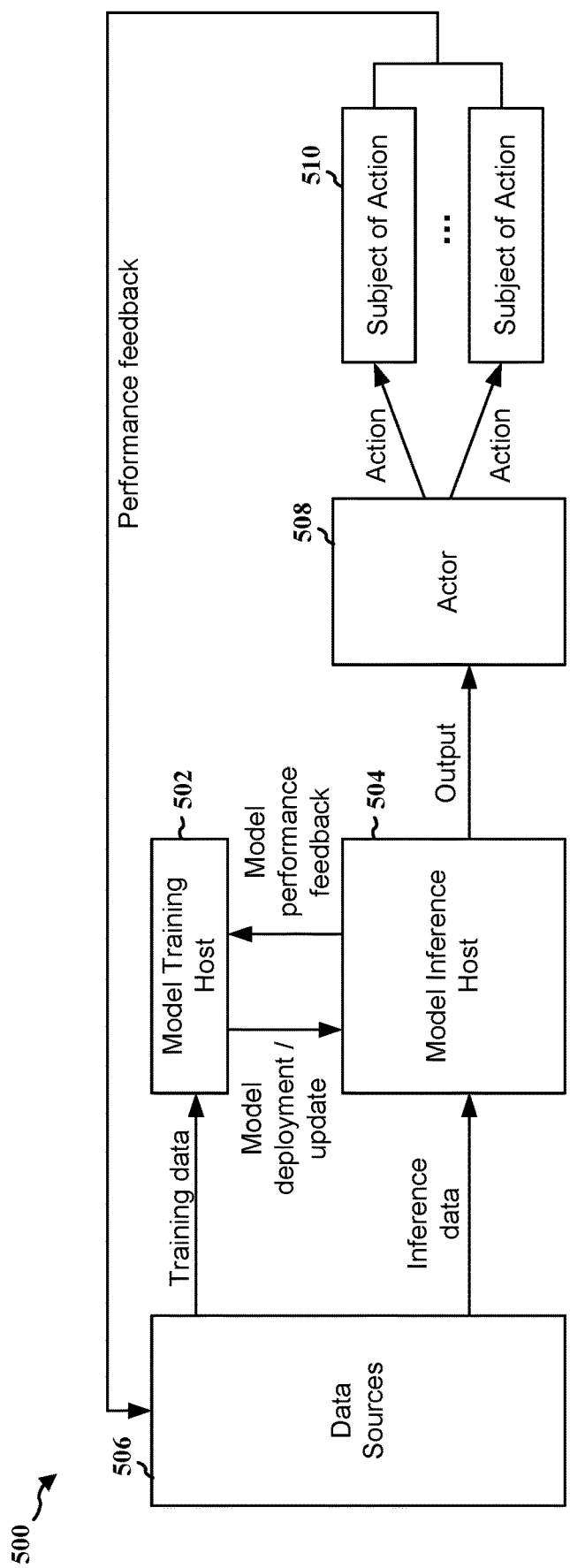
FIG. 5 is a diagram illustrating an example architecture of a functional framework for RAN intelligence enabled by data collection in accordance with various aspects of the present disclosure.

FIG. 5 is a diagram 500 illustrating an example architecture of a functional framework for RAN intelligence enabled by data collection in accordance with various aspects of the present disclosure. In some scenarios, the functional frame work for RAN intelligence may be enabled by further enhancement of data collection through uses cases and/or examples. For example, principles/algorithms for RAN intelligence enabled by artificial intelligent (AI) and the associated functional framework (e.g., the AI functionality and/or the input/output of the component for AI enabled optimization) have been utilized or studied to identify the benefits of AI enabled RAN (e.g., base station, NG-RAN, etc.) through possible use cases, e.g., energy saving, load balancing, mobility management, coverage optimization, etc. In one example, as shown by the diagram 500, a functional framework for RAN intelligence may include multiple logical entities, such as a model training host 502, a model inference host 504, data sources 506, and/or an actor 508, etc.

The model inference host 504 may be configured to run an ML/AI model based on inference data provided by the data sources 506, and the model inference host 504 may produce an output (e.g., a prediction) with the inference data input to the actor 508. The actor 508 may be an element or an entity of a core network or a RAN. For example, the actor 508 may be a base station (e.g., a gNB), a CU/DU/RU of a base station, etc. In addition, the actor 508 may also depend on the type of tasks performed by the model inference host 504, type of inference data provided to the model inference host 504, and/or type of output produced by the model inference host 504, etc. For example, if the output from the model inference host 504 is associated with beam management, the actor 508 may be a DU/RU of a base station; whereas if the output from the model inference host 504 is associated with Tx/Rx scheduling, the actor 508 may be a CU/DU of a base station, etc.

After the actor 508 receives an output from the model inference host 504, the actor 508 may determine whether to act based on the output. For example, if the actor 508 is a base station and the output from the model inference host 504 is associated with beam management, the actor 508 (e.g., the base station) may determine whether to change/modify a Tx/Rx beam based on the output. If the actor 508 determines to act based on the output, the actor 508 may indicate the action to at least one subject of action 510. For example, if the actor 508 (e.g., the base station) determines to change/modify a Tx/Rx beam for a communication between the actor 508 and the subject of action 510 (e.g., a UE), the actor 508 may transmit a beam (re-)configuration or a beam switching indication to the subject of action 510. Then, the actor 508 may modify its Tx/Rx beam based on the beam (re-)configuration, such as switching to a new Tx/Rx beam or applying different parameters for a Tx/Rx beam, etc.

The data sources 506 may also be configured for collecting data that is used as training data for training an ML model or as inference data for feeding an ML model inference operation. For example, the data sources 506 may collect data from one or more core network and/or RAN entities, which may include the subject of action 510, and provide the collected data to the model training host 502 for ML model training. For example, after a subject of action 510 (e.g., a UE) receives a beam configuration from the actor 508 (e.g., a base station), the subject of action 510 may provide performance feedback associated with the beam configuration to the data sources 506, where the performance feedback may be used by the model training host 502 for monitoring or evaluating the ML model performance, e.g., whether the output (e.g., prediction) provided by the actor 508 is accurate. In some examples, if the output provided by the actor 508 is inaccurate (or the accuracy is below an accuracy threshold), the model training host 502 may determine to modify or retrain the ML model used by the model inference host, such as via an ML model deployment/update.

Figure 6:
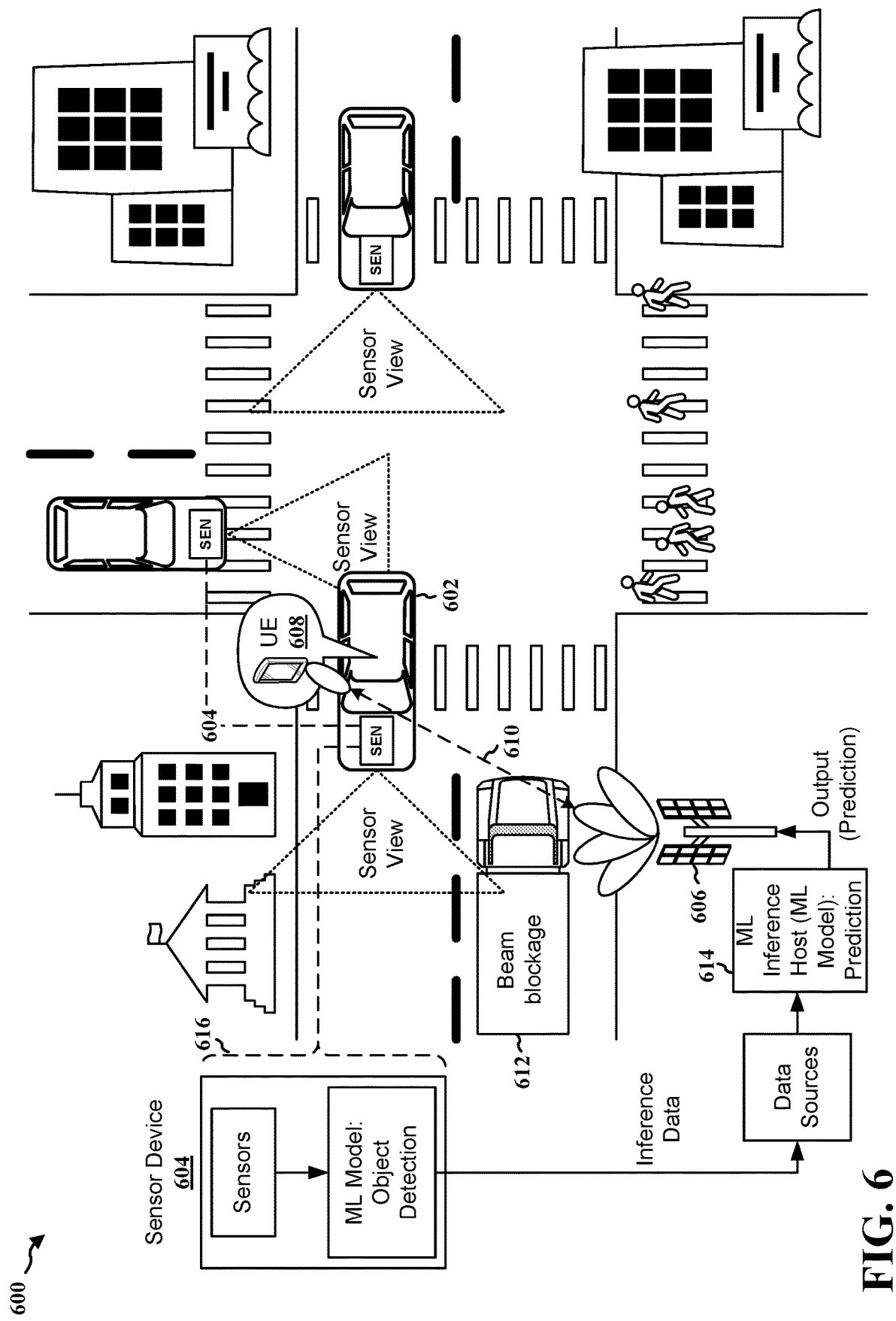
FIG. 6 is a diagram illustrating an example of leveraging data from a sensor of a vehicle to improve wireless communication in accordance with various aspects of the present disclosure.

FIG. 6 is a diagram 600 illustrating an example of leveraging data from a sensor of a vehicle to improve wireless communication in accordance with various aspects of the present disclosure. A vehicle 602 equipped with a sensor device 604 (which may be referred to as a "sensor data collector") may enter into a coverage area of a base station 606, where the coverage area of the base station 606 may include static objects (e.g., buildings) as well as non-static (e.g., moving) objects (e.g., cars, trucks, buses, and pedestrians). The sensor device 604 may be associated with or include one or more sensors, such as cameras, radars, ultra-sound sensors, and/or lidars, etc., which may collectively be referred to as "vehicle-sensors." In addition, the sensor device 604 may be a UE or include UE functions (e.g., a vehicle UE (VUE)), such that the sensor device 604 may communicate with a base station or a network entity, such as via a Uu interface connection.

In some scenarios, the radio link quality between the base station 606 and a UE may be impacted by both the static and the non-static objects. For example, a UE 608 in the vehicle 602 may be communicating with the base station 606 based on an LOS path/link. As shown at 610, at times, the communication (e.g., the LOS path/link) between the UE 608 and the base station 606 may be impacted by both moving and/or stationary objects. For example, a moving truck 612 may block the LOS path/link between the UE 608 and the base station 606, which may degrade the wireless link quality between the UE 608 and the base station 606. For purposes of the present disclosure, a wireless device or a UE used by a user in the vehicle 602 may be referred to as an "in-vehicle UE," an "end user UE," or simply an "end user." For a wireless device or a UE that is installed/mounted on a vehicle or associated with the vehicle may be referred to as a "vehicle UE." For example, an in-vehicle UE may include a mobile phone, a tablet computer, or a wearable device, whereas a vehicle UE may include a vehicle onboard computer system, a vehicle sensor device/controller, or a sensor data collector, etc.

In one aspect of the present disclosure, with sensing information provided by the sensor device 604 (e.g., the sensor data collector) of the vehicle 602, on-board computational resources of the vehicle 602, and/or an ML model used by the vehicle 602 for extracting features, the vehicle 602 may be configured to provide ML training data and/or ML inference data and information of the UE 608 (e.g., location, speed, etc.) to an ML training host (e.g., the near-RT RIC 402, the model training host 502, etc.) or an ML inference host 614 (e.g., the near-RT RIC 402, the model inference host 504, etc.) that may be collocated or associated with the base station 606 (or a component of the base station 606) for enhancing the communication between the UE 608 and the base station 606, such as improving the beam management for the UE 608. For example, as shown at 616, the sensor device 604 may use its sensors to capture images of the views surrounding the vehicle 602, and the captured images may be processed by an ML model that is associated with the sensor device 604 for feature extraction (e.g., for object detection).

Figure 7:
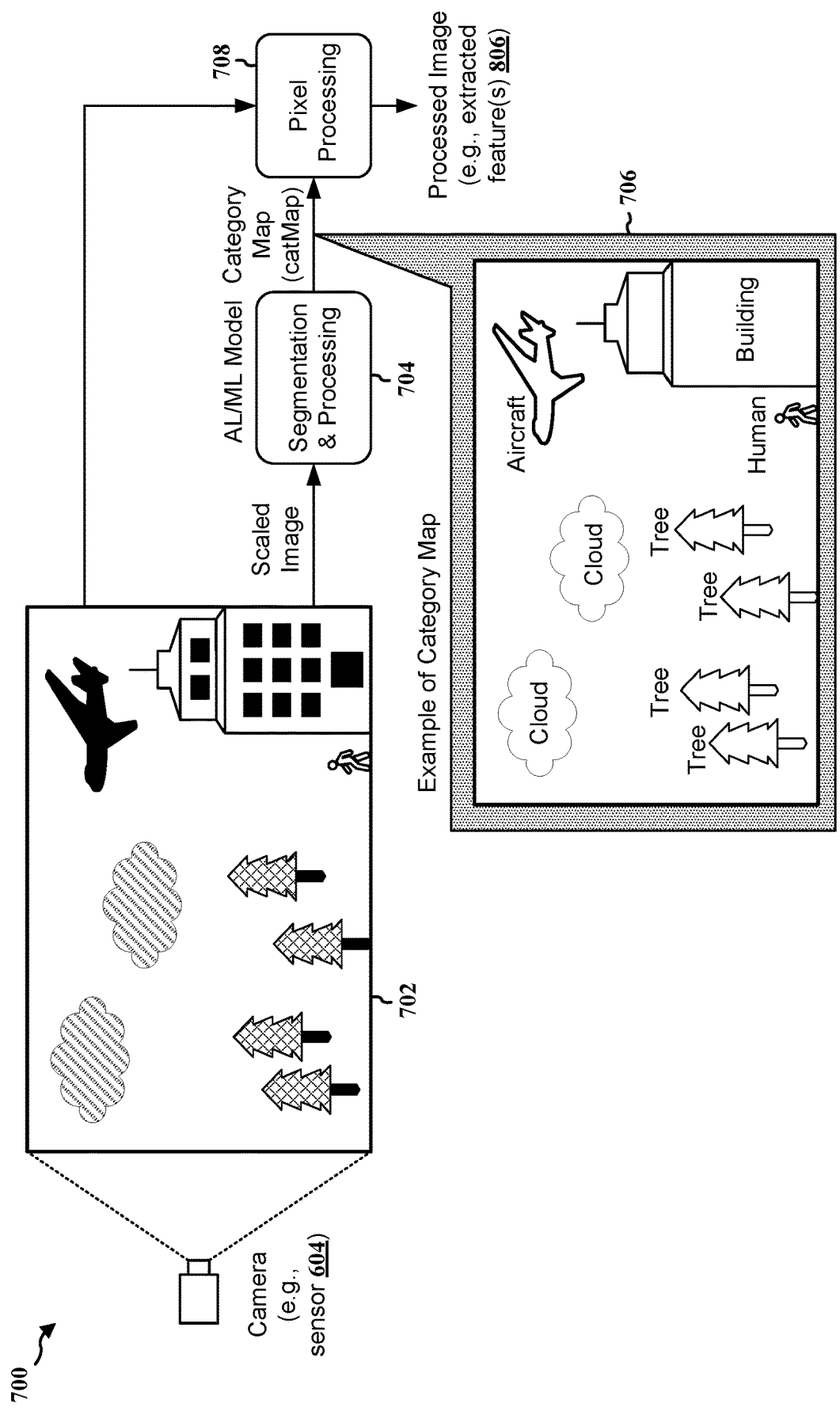
FIG. 7 is a diagram illustrating an example of extracting features for one or more objects of an area based on a sensor in accordance with various aspects of the present disclosure.

FIG. 7 is a diagram 700 illustrating an example of extracting features for one or more objects of an area based on a sensor in accordance with various aspects of the present disclosure. A sensor device (e.g., the sensor device 604) with a camera may be used to capture images of an area (e.g., the surrounding of the vehicle 602), such as shown at 702. Then, as shown at 704, the captured images may be processed by an AI/ML model associated with the sensor device to generate a category map (which may also be referred to as a "segmentation map") that identifies objects in the captured images, such as shown at 706. For example, the category map may show that the captured images include multiple objects, such as clouds, trees, a human, an aircraft, and a building, etc. Then, as shown at 708, the category map may further be processed by an image signal processor (ISP) unit/hardware associated with the sensor device, where the ISP unit/hardware may adjust the color of different segments of the captured images based on the category map and offline tuning data to produce a processed image (e.g., an image with extracted features). In one example of the extracted features, a two-dimensional (2D) array of combined sensing data (e.g., detected points with (x, y) locations from radar or lidar sensors) as an example of point clouds (e.g., dynamic map) from the sensor device may be processed to derive arithmetic dynamic objects such as bounding boxes (e.g., using you only look once (YOLO)-based object detection and localization from radar point clouds).

Referring back to FIG. 6, after features for one or more objects in the area are extracted and processed by the sensor device 604 (e.g., the sensor data collector), the sensor device 604 may transmit the extracted features as inference data to an ML inference host 614 (e.g., the ML model inference host 504) that is associated with the base station 606. Then, the ML inference host 614 may perform inference based on the inference data and produce an output (e.g., a prediction) to the base station 606, such as described in connection with FIG. 5. For purposes of the present disclosure, the process of an ML inference host performing inference based on inference data may be referred to as providing an ML inference data service. Based at least in part on the output, the base station 606 may determine whether to perform an action. For example, the inference data from the sensor device 604 may indicate that there is a truck 612 between the UE 608 and the base station 606. Then, based on the inference data, the ML inference host 614 may estimate (e.g., predict) that the communication between the UE 608 and the base station 606 may be improved by using a different beam pair between them, and the ML inference host 614 may transmit such estimation as an output to the base station 606. For purposes of the present disclosure, a "beam pair" or a "beam pair link" may refer to a Tx beam at a transmitting device and a Rx beam at a receiving device. For example, if a base station is transmitting data to a UE using a Tx beam X and the UE is receiving the data using an Rx beam Y, the Tx beam X and the Rx beam Y may be referred to as a beam pair or a beam pair link. In addition, a "beam" may refer to a beam of a beam pair which may be a Tx beam X for transmitting or an Rx beam Y for receiving.

After receiving the output (e.g., the prediction) from the ML inference host 614, the base station 606 may determine whether to act based on the output. For example, if the base station 606 determines to act based on the output, the base station 606 may generate and transmit a beam configuration to the UE 608, to reconfigure the active beams or beam pairs or candidate beam list and related parameters or transmit a beam switching indication to the UE 608, or to switch the current beam or beam pair between the UE 608 and the base station 606 to the beam or beam pair estimated/predicted by the ML inference host. On the other hand, if the base station 606 determines not to act based on the output, the base station 606 may ignore the output and continue to communicate with the UE 608 based on the current beam or beam pair. As such, the base station 606 may proactively manage beams or beam pairs with the UE 608 based on the beam prediction from the ML inference host and therefore the beam pair link quality between the UE 608 and the base station 606 may be improved based on the sensing information received from the sensor device 604 of the vehicle 602. In some examples, the sensing information received from the sensor device 604 may be external data to a core network or an RAN (e.g., the sensor data may not be collected or derived within a communication network such as the core network or the RAN).

Figure 8:
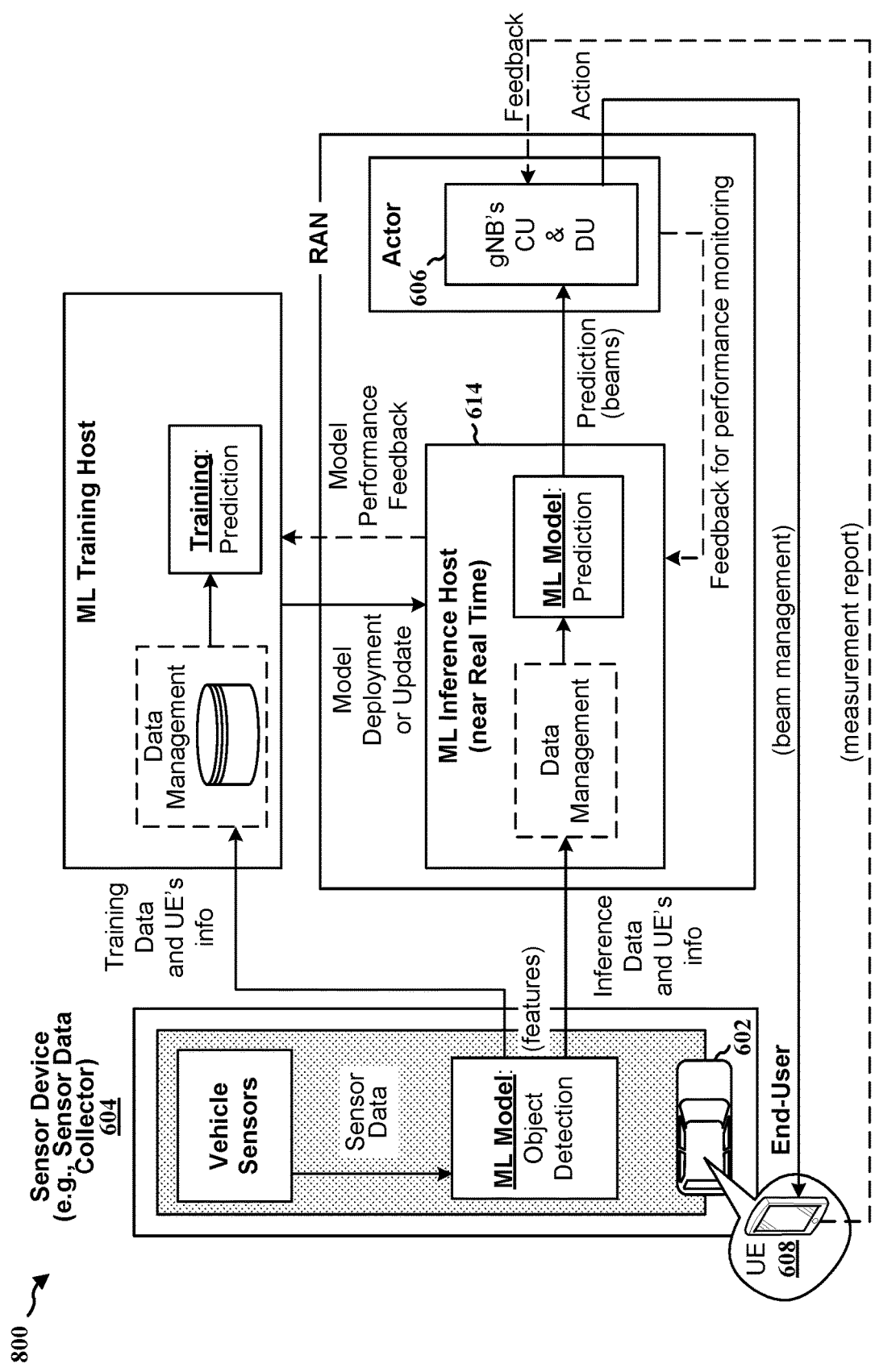
FIG. 8 is a diagram illustrating an example system architecture for utilizing sensing information from a sensor device to improve wireless communication in accordance with various aspects of the present disclosure.

FIG. 8 is a diagram 800 illustrating an example system architecture for utilizing sensing information from a sensor device (e.g., a sensor data collector) to improve wireless communication in accordance with various aspects of the present disclosure. In one example, as described in connection with FIGS. 6 and 8, the system architecture may include at least a sensor data collector (e.g., the sensor device 604) that is collocated with a vehicle (e.g., the vehicle 602), an ML inference host (e.g., the near-real time RIC 402, the ML inference host 504, 614), an actor (e.g., the actor 508, the base station 606), an ML training host (e.g., the non-real time RIC 414, the near-real time RIC 402, the model training host 502, etc.), and an end-user (e.g., an in-vehicle UE, the UE 608).

In some examples, the sensor data collector may be a vehicle including one or more sensors (e.g., cameras, radars, ultra-sound sensors, and/or lidars, etc.) and an ML model for object detection, such as described in connection with FIG. 7. The sensor data collector may provide training data to the ML training host for non-real time or offline training (e.g., an ML training host at the non-real time RIC 414 or model training host 502) or for on-line training (e.g., an ML training host at the near-real time RIC 402 or model training host 502), and the sensor data collector may provide training data or inference data and information associated with the end-user (e.g., the in-vehicle UE), respectively, to the ML training host for offline or online training or to the ML inference host for near real time inference. The ML inference host may be collocated with the actor (e.g., a base station/gNB within RAN) and may make predictions based on the inference data and information associated with the end-user provided by the sensor data collector. The actor may receive predictions produced by the ML inference host with ML model inference, and the actor may determine whether to indicate at least one action (e.g., an output) to the end-user. Then, the end-user (e.g., the in-vehicle UE) may take actions indicated by the actor and report measurement accordingly to the actor. For purposes of the present disclosure, an "ML training data service" may refer to a device (e.g., a sensor device) providing ML training data to an ML training host, and an "ML training service" may refer to an ML training host providing ML training to another ML function/entity, such as an ML inference host. Similarly, an "ML inference data service" may refer to a device (e.g., a sensor device) providing ML inference data to an ML inference host, and an "ML inference service" may refer to an ML inference host providing ML inference to a base station or to one or more components, functionalities, or entities of the base station. In some examples, the "ML training data service," the "ML training service," the "ML inference data service," and/or the "ML inference service" may be collectively referred to as an "ML data service."

Figure 9:
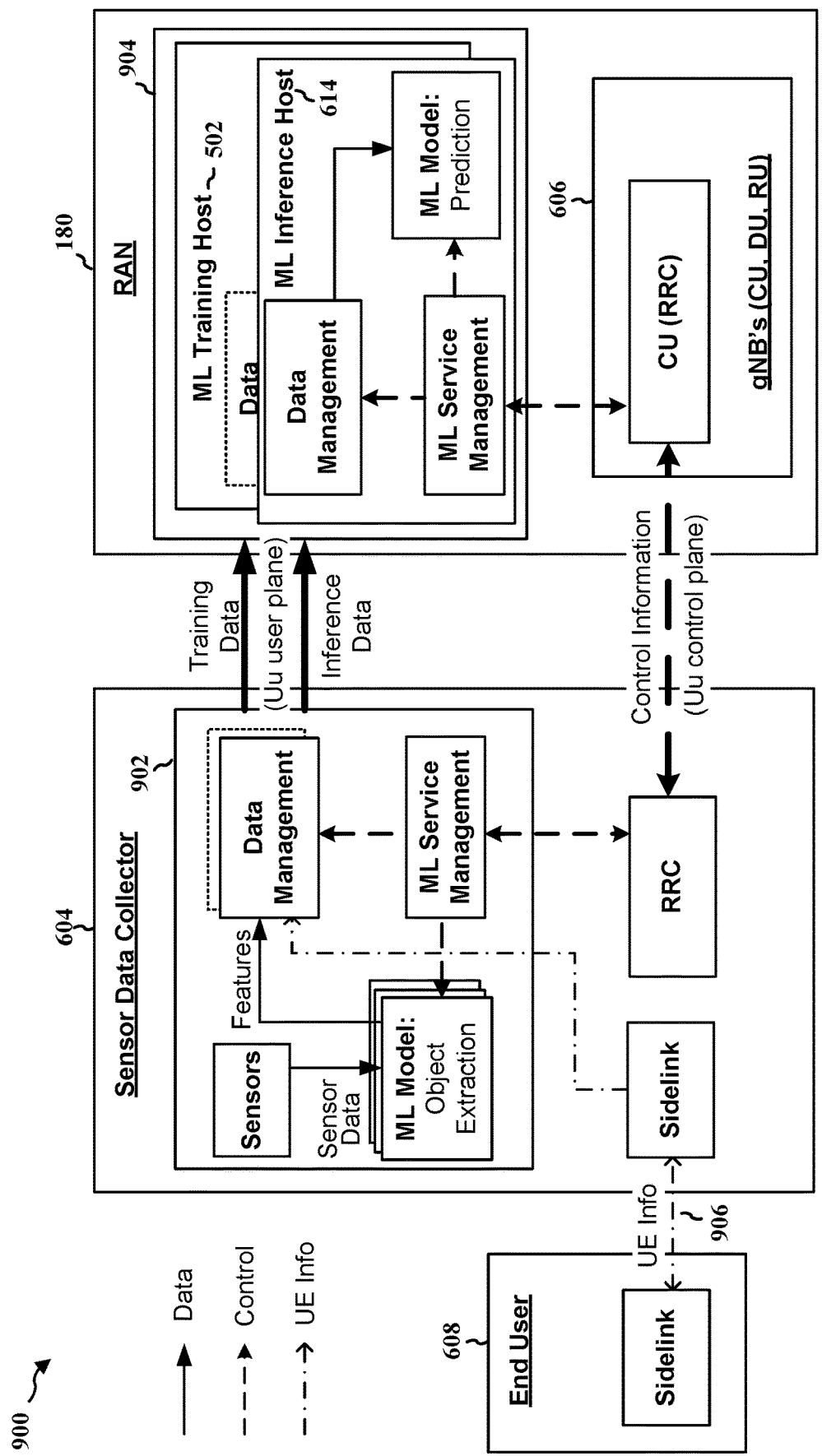
FIG. 9 is a diagram illustrating an example function overview of a machine learning (ML) data service provided by a vehicle which includes signaling procedures and parameters used for the ML data service in accordance with various aspects of the present disclosure.

FIG. 9 is a diagram 900 illustrating an example function overview of an ML data service (e.g., such as the ML training data service to the ML training host 502 or the ML inference data service to the ML inference host 614 or both) provided by a vehicle which includes signaling procedures and parameters used for the ML data service in accordance with various aspects of the present disclosure. In one example, as described in connection with FIGS. 6 to 8, a sensor data collector (e.g., the sensor device 604) may support an ML data service with equipped sensor(s) (e.g., radar(s) and/or camera(s)) and one or more ML models with one or more neural networks for extracting features from sensor data (e.g., collected from radar or camera) from a set of logical entities. For example, as shown at 902, a function component (e.g., the ML service component 198 associated with the UE 104 in FIG. 1 or a sublayer or an adaptation layer for ML services above the RRC layer of NR Uu control plane protocol stack or above the SDAP layer of NR Uu user plane protocol stack of the UE 104) may include at least an ML service management entity and a data management entity. The ML service management entity may contain control functions for ML training data service or ML inference data service such as configuration, setup, and/or release an ML training data service or an ML inference data service procedure, and the data management entity may contain functions for training data or inference data management such as processing, formatting, transferring, etc., of the training data or inference data transmitted over user plane at Uu interface. In one example, a common data management entity or a common ML service manage entity may be used for both ML training data service and ML inference data service. In another example, separate data management entities or ML service management entities are used respectively for ML training data service and ML inference data service.

As shown at 904, a function component (e.g., the ML service component 199 associated with the base station 102 or the RAN 180 in FIG. 1 or a sublayer or adaptation layer for ML services above the RRC layer of NR Uu control plane protocol stack or above the SDAP layer of NR Uu user plane protocol stack of the base station 102 or the RAN 180), may provide online ML training service to a base station with an ML training host (e.g., the near-real time RIC 402, the model training host 502) or may provide ML inference service to a base station with an ML inference host (e.g., the near-real time RIC 402, the ML inference host 504, 614) for more efficient communication with a UE (e.g., an in-vehicle UE). For example, the ML inference host may provide a centralized beam prediction service for proactive beam management with an ML service management entity and a data management entity. Similarly, the ML service management entity may contain control functions for ML training service or ML inference service such as configuration, setup, and/or release an ML training or ML inference procedure, etc., and the one or more data management entities may contain functions for training data or inference data management such as processing, formatting, loading, etc., of the training data or inference data. In some examples, the sensor data collector may communicate with the end-user (e.g., the in-vehicle UE) via sidelink (SL) direct communication such as Bluetooth communication, Wi-Fi communication, and/or PC-5 communication, etc., and the sensor data collector may communicate with the ML training host, the ML inference host, and/or the base station via Uu interface connection. In one example, a common data management entity or a common ML service manage entity may be used for one or more ML training hosts and one or more ML inference hosts. In another example, separate data management entities or ML service management entities are used respectively for one or one or more ML training hosts and one or more ML inference hosts.

In another aspect of the present disclosure, the ML training data service or ML interference data service (e.g., using sensing information from vehicle sensors to assist wireless communication for an in-vehicle UE) may be initiated by the sensor data collector or the end-user (e.g., the in-vehicle UE).

Figure 10:
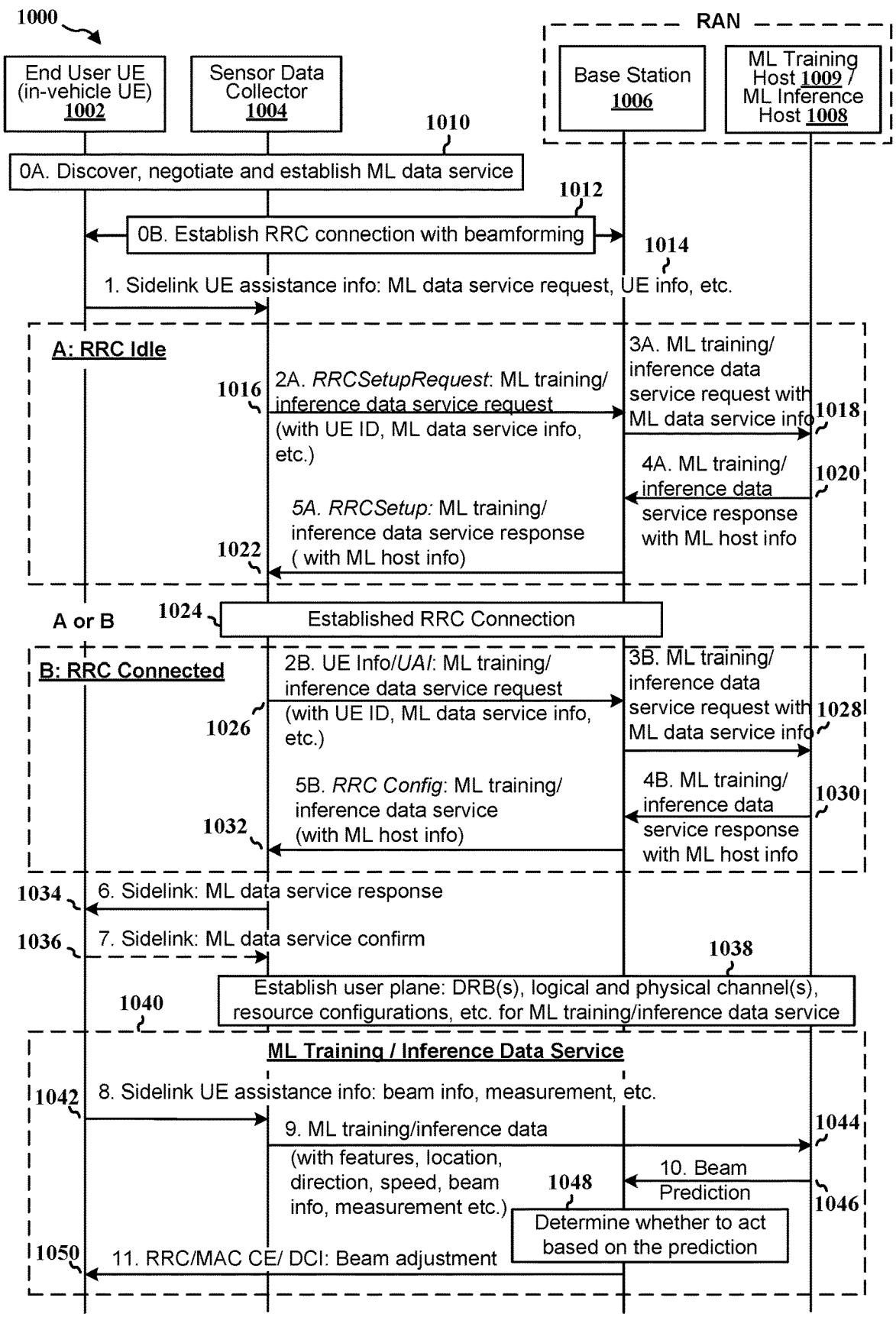
FIG. 10 is a communication flow illustrating an example of a sensor data collector initiating an ML data service in accordance with various aspects of the present disclosure.

FIG. 10 is a communication flow 1000 illustrating an example of a sensor data collector initiating an ML data service, such as the ML training data service or the ML inference data service or both to the ML training host 1009 or the ML inference host 1008, respectively, in accordance with various aspects of the present disclosure. The numberings associated with the communication flow 1000 do not specify a particular temporal order and are merely used as references for the communication flow 1000.

At 1010, a UE 1002 (e.g., the UE 608), which may be a UE as an end user in a vehicle (e.g., the vehicle 602, an in-vehicle UE, etc.), may communicate with a sensor data collector 1004 (e.g., the sensor device 604) that is collocated with the vehicle, such as described in connection with FIGS. 6, 8, and 9 (e.g., the sidelink communication). The sensor data collector 1004 may include at least one type of sensor, such as a camera, a radar, an ultra-sound sensor, and/or a lidar, etc., which may collectively be referred to as "vehicle-sensor(s)." The sensor data collector 1004 may also include at least an ML model that is at least capable of processing or extracting features from sensor data collected by the vehicle sensors. For example, as described in connection with FIG. 7, the vehicle sensors may include a camera, and the ML model may be used for detecting and classifying objects in images captured by the camera. In addition, the sensor data collector 1004 may itself be a UE (e.g., a vehicle UE) and may include capabilities to communicate with a base station, such as via establishing an RRC connection with the base station 1006 over Uu interface. In one example, the UE 1002 and the sensor data collector 1004 may discover and connect with each other via sidelink direct connection such as based on Bluetooth, Wi-Fi, and/or PC-5 communication protocols, etc., as shown at 906 of FIG. 9, and the UE 1002 and the sensor data collector 1004 may negotiate with each other to establish an ML data service for the UE 1002 that is to be provided by the sensor data collector 1004. In other words, the UE 1002 may request the sensor data collector 1004 to provide the ML data service, such that sensor data captured by the vehicle sensors or features extracted by the ML model of the sensor data collector 1004 may be used for optimizing/improving the communication with the base station at Uu interface for the UE 1002. In one example, the ML data service may include an ML training data service for training or retraining one or more ML models (e.g., online training) used for inference by one or more ML inference hosts associated with the base station 1006. In another example, the ML data service may include an ML inference data service for ML models used for inference by one or more ML inference hosts associated with the base station 1006.

At 1012, the UE 1002 may establish an RRC connection with a base station 1006 (e.g., the base station 606). The base station 1006 may be associated with at least an ML training host 1009 (e.g., the near-RT RIC 402, the model training host 502, etc.) or an ML inference host 1008 (e.g., the near-RT RIC 402, the model inference host 504, the ML inference host 614, etc.), such as described in connection with FIGS. 6, 8, and 9. In one example, the base station 1006, the ML training host 1009, and the ML inference host 1008 may be part of a RAN. After the RRC connection is established between the UE 1002 and the base station 1006, the UE 1002 and the base station 1006 may communicate with each other using one or more beam pair links. In some examples, the UE 1002 may be able to determine the Tx beam(s) from the base station 1006 (e.g., angle of departure (AoD) or spatial filter such as Quasi-Co-Location (QCL) or TCI state association with SSB or CSI-RS) and the associated Rx beam(s) at the UE 1002 (e.g., angle of arrival (AoA) or spatial filter such as QCL or TCI state association with SSB or CSI-RS) as well as a candidate beam list for monitoring.

At 1014, the UE 1002 may transmit, to the sensor data collector 1004, a sidelink message including an indication or a request for ML data service such as ML training data service or ML inference data service or both, and information associated with the UE 1002. In one example, the information associated with the UE 1002 may include a UE ID (e.g., C-RNTI received from the base station 1006 while establishing RRC connection with the base station) or a device ID of UE 1002 or a layer 2 ID associated to the sidelink connection. The sidelink message may be a sidelink RRC message such as sidelink UE assistance information message on PC5 interface.

After receiving the sidelink message from the UE 1002 at 1014 (e.g., an indication or a request for the ML training data service or the ML inference data service or both, information associated with the UE 1002, etc.), the sensor data collector 1004 may send an ML training data service or ML inference data service request or both at 1016 to the base station 1006 to request an ML training data service or an ML inference data service or both to be provided to the base station 1006 (or to the ML training host 1009 or the ML inference host 1008 via the base station 1006 at 1018) based on the received sidelink message from the UE 1002 at 1014, where the ML training data service or the ML inference data service request message may include the UE information and additional information provided/measured by the sensor data collector 1004.

In one example, as shown at 1016, if the sensor data collector 1004 is not RRC connected to the base station 1006 (e.g., the sensor data collector 1004 is in an RRC idle mode or in an RRC disconnected mode), the sensor data collector 1004 may include an ML training data service or an ML inference data service or both for establishmentCause within an RRC setup request message to the base station 1006. The RRC setup request message may include the UE ID or a device ID or a layer 2 ID received from the UE 1002 at 1014 (e.g., the ML training data service or ML inference data service may be for an end user identified by the UE ID), and also information related to the ML data service (e.g., ML training data service or ML inference data service) provided by the sensor data collector 1004 based on the ML service information received from the system information (SI) acquisition or received from the specific SI for ML service (e.g., per the request from sensor data collector 1004). For example, the information related to the ML data service may include one or more ML models for feature extraction (e.g., an ML model ID or an ML model name such as YOLO for feature extraction), sensor types (e.g., camera, radar, lidar, etc.,) or extracted features (e.g., bounding boxes from YOLO) for ML training data service or ML inference data service, one or more ML training models supported (e.g., an ML training model ID or an ML training model name), one or more ML inference models supported (e.g., an ML inference model ID or an ML inference model name), etc., or any combination thereof. In other words, the RRC setup request message transmitted by the sensor data collector 1004 may include ML training data service request or ML inference data service request or both implicitly with establishmentCause set with ML training data service for ML training data service request and/or establishmentCause set with ML inference data service for ML inference data service request.

At 1018, after receiving the RRC setup request message from the sensor data collector 1004, the base station 1006 may validate the ML data service (e.g., ML training data service or ML inference data service or both) provided by the sensor data collector 1004 for the UE 1002 based on the service subscription or service profile (e.g., based on the UE ID or device ID for the UE 1002 or the sensor data collector 1004, respectively) and the information related to the sensor data collector 1004 (e.g., UE context, UE capability, etc., received while establishing an RRC connection) and then transmit or forward the ML training data service request or the ML inference data service request or both to the ML training host 1009 or the ML inference host 1008, respectively, where the ML training data service request or the ML inference data service request may include the information related to the ML data service (e.g., ML model ID(s) or ML model names for feature extraction, sensor types or extracted feature types or names for the ML training data service or the ML inference data service, ML training model IDs or names supported, ML inference model IDs or names supported, etc.) from the sensor data collector 1004 for online ML training or near real time ML inference, respectively.

At 1020, the ML training host 1009 or the ML inference host 1008 may determine whether to accept the ML training data service request or the ML inference data service request respectively based on the information related to the ML training data service or the ML inference data service (e.g., based on if the ML training host 1009 or ML inference host 1008 is able to support the ML training data or the ML inference data and/or if the ML inference host 1008 is able to provide predictions to the base state 1006 for the UE 1002) and respond to the ML training data service request or the ML inference data service request via an ML training data service response message or an ML inference data service response message. For example, the ML training data service response message or the ML inference data service response message may indicate whether the ML training host 1009 or the ML inference host 1008 is able to accept the ML training data service or the ML inference data service provided by the sensor data collector 1004 for the UE 1002. If the ML training host 1009 or the ML inference host 1008 is able to take the ML training data service or the ML inference data service, the ML training data service response or the ML inference data service response message may include an acknowledgement for the ML training data service or the ML inference data service with ML host information (e.g., ML training host ID or the ML inference host ID, the ML model ID(s) or name(s) for ML training data service or ML inference data service, supported sensor type(s) or feature type(s) or name(s), etc.), whereas if the ML training host 1009 or the ML inference host 1008 is unable to take the ML training data service or the ML inference data service, the ML training data service repose message or the ML inference data service response message may include a negative-acknowledgement, a reject reason, and/or a cause (e.g., ML model(s) not supported, feature type(s) not supported, etc.) for the ML training data service or the ML inference data service.

At 1022, depending on whether the ML training host 1009 or the ML inference host 1008 is able to accept the ML training data service or the ML inference data service provided by the sensor data collector 1004 for the UE 1002, the base station 1006 may inform the sensor data collector 1004 with the ML host information received from ML training data service response or ML inference data service, and additionally, the configuration for the ML training data service or the ML inference data service. For example, if the ML training host 1009 or the ML inference host 1008 is able to take the ML training data service or the ML inference data service provided by the sensor data collector 1004 for the UE 1002, the base station 1006 may inform the sensor data collector 1004 about the configuration for the ML training data service or the configuration for the ML inference data service or both via an RRC setup message or an RRC configuration message after the RRC setup is completed.

In some aspects, the ML training data service request and response and/or the ML inference data service request and response may be conducted separately or jointly. For one example, either the ML training data service request and response for ML training data service or the ML inference data service request and response for ML inference data service may be conducted. For another example, the ML training data service request and response may be conducted initially for ML training data service and then the ML inference data service request and response may be conducted for ML inference data service after the ML training procedure and the trained ML inference model is loaded into the ML inference host. For another example, the ML training data service request and response for ML training data service and the ML inference data service request and response for ML inference data service may be conducted jointly (e.g., both ML training data service information and ML inference data service information, both ML training host information and ML inference host information, etc., are included in an ML data service request message and an ML data service response message respectively, where an ML service management entity as shown in FIG. 9 may be used by both the ML training host 1009 and the ML inference host 1008 for processing jointly the ML training data service request and response for ML training data service and the ML inference data service request and response for ML inference data service) so that the ML inference data service may be started after the ML training procedure and the trained ML inference model is loaded into the ML inference host without another procedure for the ML inference data service request and response for ML inference data service.

At 1024, based on the RRC setup message or the RRC configuration message received from the base station 1006, the sensor data collector 1004 may establish an RRC connection with the base station 1006 for the ML training data service or the ML inference data service.

In another example, as shown at 1026, if the sensor data collector 1004 is RRC connected to the base station 1006, the sensor data collector 1004 may transmit an RRC message, e.g., a UE capability or information message or a UE Assistance Information (UAI) message, to the base station 1006, that includes (implicitly) the ML training data service request or the ML inference data service request or both, and the RRC message (e.g., the UE capability or information message or the UAI message), the ML training data service request, and/or the ML inference data service request may also include the UE ID received from the UE 1002 at 1014 (e.g., the ML training data service or ML inference data service may be for an end user identified by the UE ID), and also information related to the ML data service (e.g., ML training data service or ML inference data service) provided by the sensor data collector 1004 based on the ML service information received from the system information (SI) acquisition or received from the specific SI for ML service (e.g., per the request from sensor data collector 1004). For example, the information related to the ML data service may include one or more ML models for feature extraction, e.g., an ML model ID or an ML model name such as YOLO for feature extraction), sensor types (e.g., camera, radar, lidar, etc.,) or extracted features (e.g., bounding boxes from YOLO) for ML training data service or ML inference data service, one or more ML training models supported (e.g., an ML training model ID or an ML training model name), one or more ML inference models supported (e.g., an ML inference model ID or an ML inference model name), etc., or any combination thereof. In other words, the RRC message transmitted by the sensor data collector 1004 may include ML training data service request or ML inference data service request or both implicitly with the indication of ML training data service for ML training data service request or ML inference data service for ML inference data service request or both.

At 1028, after receiving the RRC message (e.g., the UE capability or information message or the UE assistance information UAI message) from the sensor data collector 1004, the base station 1006 may validate the ML data service (e.g., ML training data service or ML inference data service or both) provided by the sensor data collector 1004 for the UE 1002 based on the service subscription or service profile (e.g., based on the UE ID or device ID for the UE 1002 or the sensor data collector 1004, respectively) and the information related to the sensor data collector 1004 (e.g., UE context, UE capability, etc. received while establishing an RRC connection) and then transmit or forward the ML training data service request or the ML inference data service request or both to the ML training host 1009 or the ML inference host 1008, respectively, where the ML training data service request or the ML inference data service request may include the information related to the ML data service (e.g., ML model ID(s) or ML model names for feature extraction, sensor types or extracted feature types or names for ML training data service or ML inference data service, ML training model IDs or names supported, ML inference model IDs or names supported, etc.) from the sensor data collector 1004 for online ML training or near real time ML inference, respectively.

At 1030, the ML training host 1009 or the ML inference host 1008 may determine whether to accept the ML training data service request or the ML inference data service request respectively based on the information related to the ML training data service or the ML inference data service (e.g., based on if the ML training host 1009 or ML inference host 1008 is able to support the ML training data or the ML inference data and/or if the ML inference host 1008 is able to provide predictions to the base state 1006 for the UE 1002) and respond to the ML training data service request or the ML inference data service request via an ML training data service response message or an ML inference data service response message. For example, the ML training data service response message or the ML inference data service response message may indicate whether the ML training host 1009 or the ML inference host 1008 is able to accept the ML training data service or the ML inference data service provided the sensor data collector 1004 for the UE 1002. If the ML training host 1009 or the ML inference host 1008 is able to take the ML training data service or the ML inference data service, the ML training data service response or the ML inference data service response message may include an acknowledgement for the ML training data service or the ML inference data service with ML host information (e.g., ML training host ID or the ML inference host ID, the ML model ID(s) or name(s) for ML training data service or ML inference data service, supported sensor type(s) or feature type(s) or name(s), etc.), whereas if the ML training host 1009 or the ML inference host 1008 is unable to take the ML training data service or the ML inference data service, the ML training data service repose message or the ML inference data service response message may include a negative-acknowledgement, a reject reason and/or a cause (e.g., ML model(s) not supported, feature type(s) not supported, etc.) for the ML training data service or the ML inference data service.

At 1032, depending on whether the ML training host 1009 or the ML inference host 1008 is able to accept the ML training data service or the ML inference data service provided by the sensor data collector 1004 for the UE 1002, the base station 1006 may inform the sensor data collector 1004 with the ML host information received from ML training data service response or ML inference data service, and additionally, the configuration for the ML training data service or the ML inference data service. For example, if the ML training host 1009 or the ML inference host 1008 is able to take the ML training data service or the ML inference data service provided by the sensor data collector 1004 for the UE 1002, the base station 1006 may inform the sensor data collector 1004 about the configuration for the ML training data service or the configuration for the ML inference data service or both via an RRC configuration message.

In some aspects, the ML training data service request and response and/or the ML inference data service request and response may be conducted separately or jointly. For one example, either the ML training data service request and response for ML training data service or the ML inference data service request and response for ML inference data service may be conducted. For another example, the ML training data service request and response may be conducted initially for ML training data service and then the ML inference data service request and response may be conducted for ML training data service after the ML training procedure and the trained ML inference model is loaded into the ML inference host. For another example, the ML training data service request and response for ML training data service and the ML inference data service request and response for ML inference data service may be conducted jointly (e.g., both ML training data service information and ML inference data service information, both ML training host information and ML inference host information, etc., are included in an ML data service request message and an ML data service response message respectively, where an ML service management entity as shown in FIG. 9 may be used by both the ML training host 1009 and ML inference host 1008 for processing jointly the ML training data service request and response for ML training data service and the ML inference data service request or response for ML inference data service) so that the ML inference data service may be started after the ML training procedure and the trained ML inference model is loaded into the ML inference host without another procedure for the ML inference data service request or response for ML inference data service.

At 1034, after being informed regarding the acceptance of the ML training data service or the ML inference data service or both, either via an RRC setup message as shown at 1022 or an RRC configuration message as shown at 1032, the sensor data collector 1004 may transmit an ML data service acceptance message (e.g., the request for ML training data service or the ML inference data service or both are accepted) to the UE 1002. In one example, the ML data service response may be transmitted based on the UE 1002's request for the ML data service at 1010 and/or 1014.

At 1036, in response to the ML data service response, the UE 1002 may transmit an ML data service confirmation message to the sensor data collector 1004 to confirm the availability of the ML data service such as ML training data service and/or the ML inference data service.

At 1038, the sensor data collector 1004 may establish user plane with the ML training host 1009 or the ML inference host 1008 via the base station 1006, including configuring data radio bearers (DRBs), logical and physical channels, as well as resource configuration for periodic or autonomous transmissions of ML training data or ML inference data to the ML training host 1009 or the ML inference host 1008 via the base station 1006 for the ML training data service or the ML inference data service, respectively, such that the ML training data service or the ML inference data service may be activated or established for the sensor data collector 1004, such as shown at 1040. Then, during the ML inference data service, the base station 1006 may perform communication management for the UE 1002 based on the ML inference host's prediction which is produced with the ML inference data service provided by the sensor data collector 1004 with UE information and information related to the sensor data collector 1004 and sensor data or extracted features from the sensor data.

For example, as shown at 1042, the UE 1002 may transmit updated UE information to the sensor data collector 1004, such as current location, orientation, direction, speed, beam information associated with the UE 1002, where the beam information (e.g., one or more beams or beam pair links for which the UE 1002 currently uses for communicating with the base station 1006, the AoA/AoD for one or more beams, the spatial filter with QCL or TCI state associated with one or more beams, and/or a candidate beam list that may be used by the UE 1002, etc.) may be updated based on beam adjustment indication from the base station 1006. Similarly, the UE 1002 may transmit the updated UE information to the sensor data collector 1004 via a sidelink message, e.g., a PC5 RRC message such as sidelink UE assistance information message, if the UE 1002 and the sensor data collector 1004 are communicating with each other over sidelink. In some examples, the updated UE information may further include one or more beam measurements (e.g., reference signal received power (RSRP) measurement of each beam) for one or more beam pairs between the UE 1002 and the base station 1006.

At 1044, the sensor data collector 1004 may transmit training/inference data captured by the vehicle sensors and/or extracted by the ML model of the sensor data collector 1004 to the ML training host 1009 and/or the ML inference host 1008 along with the updated UE information received at 1042 (e.g., via the established user plane), such as described in connection with FIGS. 6 to 9. For example, the sensor data collector 1004 may use a camera to capture the surrounding images of the vehicle (e.g., the vehicle in which the UE 1002 and the sensor data collector 1004 is located), and the ML model of the sensor data collector 1004 may extract one or more features from the surrounding images, such as identifying one or more objects (e.g., cars, trees, pedestrians, buildings, etc.) surrounding the vehicle as described in connection with FIG. 7. Then, the sensor data collector 1004 may transmit the extracted features and the updated UE information received from the UE 1002 at 1042 or the updated UE information collected or measured by the sensor data collector 1004 (e.g., location, direction, speed, etc.) to the ML inference host 1008 as ML inference data or to the ML training host 1009 as ML training data. For example, the inference data transmitted to the ML inference host 1008 or the ML training data transmitted to the ML training host 1009 may include extracted features, location of the vehicle (or the UE 1002), the direction of the vehicle (or the UE 1002), the speed of the vehicle (or the UE 1002), and/or the beam information provided by the UE 1002, etc.

For purposes of the present disclosure, the information associated with the UE 1002 may be referred to as "UE information." hereafter. In one example, the UE information may include orientation of the UE 1002, which may be referenced from the sensor data collector 1004's frame (e.g., mounted on a charging block, sensed inside the vehicle, etc.), and/or the UE 1002's pedestrian dead-reckoning (PDR) based information (e.g., using gyroscope and accelerometer sensors). In another example, the UE information may include location of the UE 1002, which may be measured at the UE 1002 (e.g., GPS coordination) or referenced from the location (e.g., GPS coordination) of the sensor data collector 1004. In another example, the UE information may include speed of the UE 1002, which may be measured at the UE 1002 or based on the speed of the sensor data collector 1004. In another example, the UE information may include the one or more beam pair links for which the UE 1002 uses for communicating with the base station 1006, the angle of arrival (AoA) for one or more beams, the angle of departure (AoD) for one or more beams, the QCL or TCI state associated with one or more beams, and/or at least one candidate beam list that may be monitored by the UE 1002, etc. In one example, if the UE 1002 is communicating with the sensor data collector 1004 based on sidelink direct connection, e.g., the UE 1002 may transmit the UE information to the sensor data collector 1004 via a sidelink UE assistance information message (e.g., PC5 RRC message such as sidelink UE assistance info message). Note some of the information included in the ML training data service or the ML inference data service request message may be provided by either the UE 1002 or the sensor data collector 1004. For example, the UE 1002 and the sensor data collector 1004 may both have the capability to determine or measure the speed, the orientation, the direction, and/or the location of the vehicle. Thus, information related to the speed, the orientation, the direction, and/or the location of the vehicle may be provided by the UE 1002 at 1014 and/or measured by the sensor data collector 1004.

At 1046, after receiving the inference data from the sensor data collector 1004, the ML inference host 1008 may perform an inference (e.g., a prediction) based on the inference data, and the ML inference host 1008 may transmit the inference output (e.g., the prediction) to the base station 1006. For example, after receiving the extracted features, the location, direction, and/or speed of the vehicle (or the UE 1002), and the beam information between the UE 1002 and the base station 1006 from the sensor data collector 1004, the ML inference host 1008 may predict whether the communication between the UE 1002 and the base station 1006 may be improved by switching to one or more different beam pairs or changing one or more communication parameters (e.g., the transmission power, direction, periodicity, duration, etc.). Then, the ML inference host 1008 may inform the base station 1006 regarding its prediction. For example, if the ML inference host 1008 predicts that the communication between the UE 1002 and the base station 1006 may be improved by using beam pair X because the current beam pair Y used by the UE 1002 and the base station 1006 may experience a blockage (e.g., the extracted feature indicates there is a truck in between as shown by FIG. 6), the ML inference host 1008 may transmit a beam prediction to the base station 1006 indicating the base station 1006 to use the beam pair X.

At 1048, after receiving the inference (e.g., the prediction) from the ML inference host 1008, the base station 1006 may determine whether to act based on the inference (e.g., whether to apply prediction suggested by the ML inference host 1008).

At 1050, if the base station 1006 determines to act based on the inference (e.g., the base station 1006 adopts/accepts the prediction provided by the ML inference host 1008), the base station 1006 may transmit an indication or a configuration to the UE 1002 to configure one or more communication parameters or beams or to switch beams for the UE 1002. For example, if the inference from the ML inference host 1008 predicts that the communication between the base station 1006 and the UE 1002 may be improved by using (e.g., switching to) the beam pair X, the base station 1006 may transmit a beam indication/configuration/adjustment message to the UE 1002 to indicate/configure/adjust the UE 1002 to use the beam pair X. In one example, the base station 1006 may transmit the indication or the configuration via an RRC message (e.g., for reconfiguration), the indication or an adjustment via a medium access control (MAC)-control element (MAC-CE) (e.g., for activation), or an adjustment via downlink control information (DCI) (e.g., for signaling).

On the other hand, if the base station 1006 determines not to act based on the inference, the base statin 1006 may ignore the inference output (e.g., no configuration will be transmitted to the UE 1002 at 1050).

After receiving the indication/configuration/adjustment from the base station 1006 for the communication between the UE 1002 and the base station 1006, the UE 1002 may adjust the current beams or candidate beam list based on the received indication/configuration/adjustment and communicate with the base station 1006 based on the adjusted beams. In some examples, after the UE 1002 adjusts the current beams or candidate beam list per the indication/configuration/adjustment, the UE 1002 may perform one or more measurements for the communication, such as beam measurements, and the UE 1002 may report the measurements to the sensor data collector 1004 (e.g., at 1042), where the measurements may be forwarded to the ML inference host 1008 for ML inference model performance monitoring. In some examples, the UE 1002 may also transmit the measurements directly to the ML training host 1009 (e.g., the model training host 502). Based at least in part on the measurements, the ML training host 1009 may determine whether to retrain or configure the ML inference host 1008, such as described in connection with FIG. 5.

Figure 11:
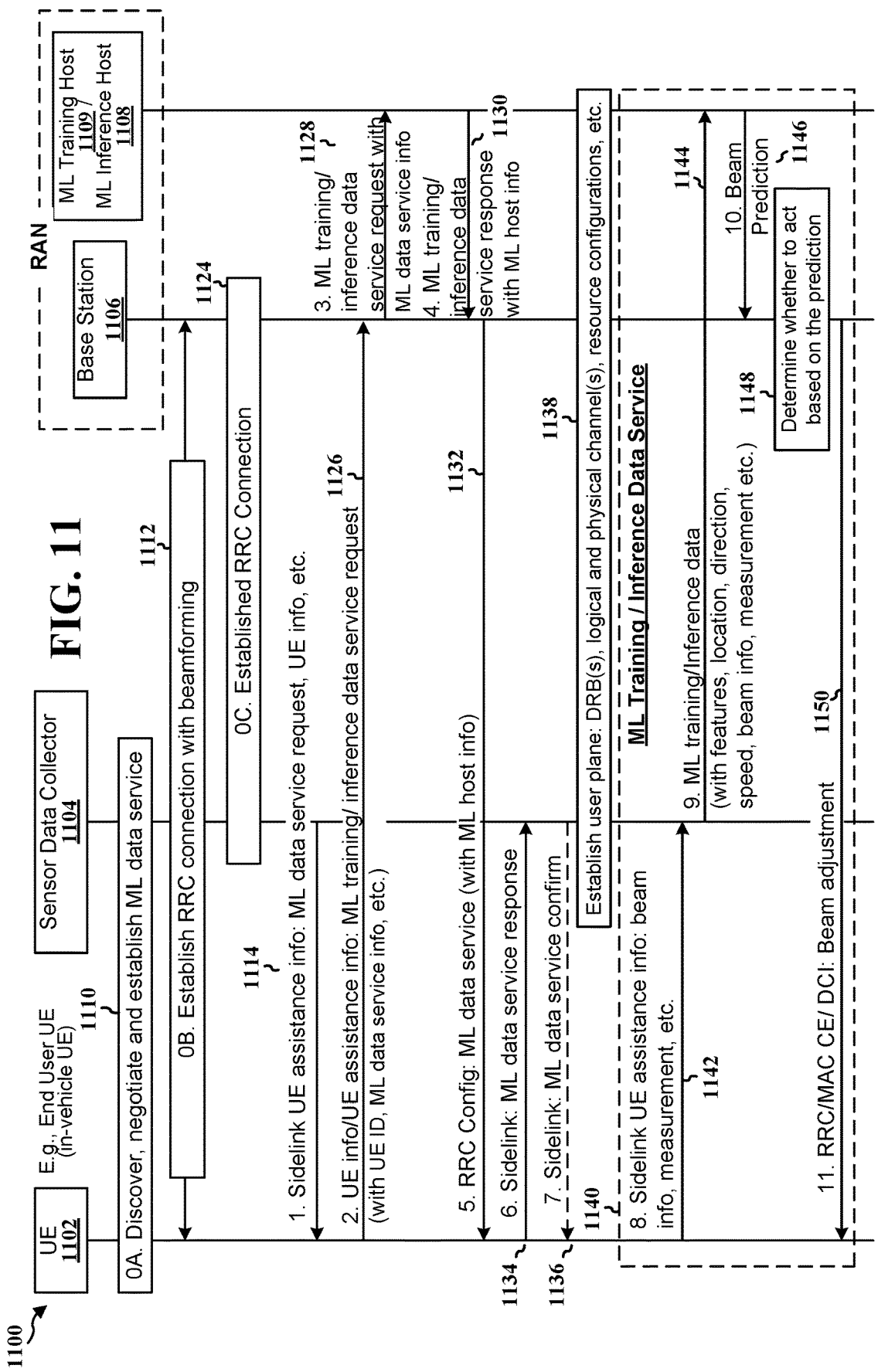
FIG. 11 is a communication flow illustrating an example of an in-vehicle UE initiating an ML data service in accordance with various aspects of the present disclosure.

FIG. 11 is a communication flow 1100 illustrating an example of an in-vehicle UE initiating an ML data service such as ML training data service or ML inference data service in accordance with various aspects of the present disclosure. The numberings associated with the communication flow 1100 do not specify a particular temporal order and are merely used as references for the communication flow 1100.

At 1110, a UE 1102 (e.g., the UE 608), which may be a UE as an end user in a vehicle (e.g., the vehicle 602, an in-vehicle UE, etc.), may communicate with a sensor data collector 1104 (e.g., the sensor device 604) that is collocated with the vehicle, such as described in connection with FIGS. 6, 8, and 9 (e.g., the sidelink communication). The sensor data collector 1104 may include at least one type of sensor, such as a camera, a radar, an ultra-sound sensor, and/or a lidar, etc., which may collectively be referred to as "vehicle-sensor(s)." The sensor data collector 1104 may also include at least an ML model that is at least capable of processing or extracting features from sensor data collected by the vehicle sensors. For example, as described in connection with FIG. 7, the vehicle sensors may include a camera, and the ML model may be used for detecting and classifying objects in images captured by the camera. In addition, the sensor data collector 1104 may itself be a UE (e.g., a vehicle UE) and may include capabilities to communicate with a base station, such as via establishing an RRC connection with the base station 1106 over Uu interface. In one example, the UE 1102 and the sensor data collector 1104 may discover and connect with each other via sidelink direct connection such as Bluetooth, Wi-Fi, and/or PC-5 communication protocols, etc., as shown at 906 of FIG. 9, and the UE 1102 and the sensor data collector 1104 may negotiate with each other to establish an ML data service for the UE 1002 that is to be provided by the sensor data collector 1104. In other words, the UE 1102 may request the sensor data collector 1104 to provide the ML data service, such that sensor data captured by the vehicle sensors or features extracted by the ML model of the sensor data collector 1104 may be used for optimizing/improving the communication with the base station at Uu interface for the UE 1102. In one example, the ML data service may include an ML training data service for training or retraining one or more ML models (e.g., online training) used for inference by one or more ML inference hosts associated with the base station 1106. In another example, the ML data service may include an ML inference data service for ML models used for inference by one or more ML inference hosts associated with the base station 1106.

At 1112, the UE 1102 may establish an RRC connection with a base station 1106 (e.g., the base station 606). The base station 1106 may be associated with at least an ML training host 1109 (e.g., the near-RT RIC 402, the model training host 502, etc.) or an ML inference host 1108 (e.g., the near-RT RIC 402, the model inference host 504, the ML inference host 614, etc.), such as described in connection with FIGS. 6, 8, and 9. In one example, the base station 1106 and the ML training host 1109 and the ML inference host 1108 may be part of a RAN. After the RRC connection is established between the UE 1102 and the base station 1106, the UE 1102 and the base station 1106 may communicate with each other using one or more beam pair links. In some examples, the UE 1102 may be able to determine the Tx beam(s) from the base station 1106 (e.g., angle of departure (AoD) or spatial filter such as QCL or TCI state association with SSB or CSI-RS) and the associated Rx beam(s) at the UE 1102 (e.g., angle of arrival (AoA) or spatial filter such as Quasi-Co-Location (QCL) or transmission configuration indication (TCI) state association with SSB or CSI-RS) as well as a candidate beam list for monitoring.

At 1124, the sensor data collector 1104 may also establish an RRC connection with the base station 1106, such that the sensor data collector 1104 may communicate with the base station 1106.

At 1114, the sensor data collector 1104 may transmit, to the UE 1102, a sidelink message including an indication for ML data service such as ML training data service or ML inference data service or both, and information associated with the vehicle and/or the sensor data collector 1104. For example, the information associated with the vehicle and/or the sensor data collector 1104 may include the UE ID (e.g., C-RNTI received from the base station 1106 while establishing RRC connection with the base station) or a device ID or a layer 2 ID, orientation of the vehicle, the location of the vehicle, the speed of the vehicle, the direction of the vehicle, one or more ML models for feature extraction and/or features supported by the sensor data collector 1104, an ML data service such as an ML training data service or an ML inference data service or both, etc. In one example, if the sensor data collector 1104 is communicating with the UE 1102 based on sidelink, the sensor data collector 1104 may transmit the information associated with the vehicle and/or the sensor data collector 1104 to the UE 1102 via a sidelink message (e.g., PC5 RRC message such as sidelink UE assistance info message).

At 1126, after receiving the information associated with the vehicle and/or the sensor data collector 1104 from the sensor data collector 1104, the UE 1102 may send an RRC message, e.g., a UE capability or information message or a UE Assistance Information (UAI) message, including (implicitly) an ML training data service request or an ML inference data service request or both to the base station 1106 to request the ML training data service (e.g., to the ML training host 1109 or the model training host 502 via the base station 1106) or the ML inference data service (e.g., to the ML inference host 1108 or the ML inference host 614 via the base station 1106) provided by the sensor data collector 1104 for UE 1102, where ML training data service request or the ML inference data service request message may include the UE ID or device ID received from sensor data collector 1104 at 1114 (e.g., the ML training data service or ML inference data service provided by the sensor data collector 1104 identified by the UE ID or the device ID or the layer 2 ID is valid for the end user UE 1102), the information associated with the ML data service (e.g., ML training data service or ML inference data service) provided by the vehicle and/or the sensor data collector 1104 based on the ML service information received from the system information (SI) acquisition or received from the specific SI for ML service (e.g., per the request from sensor data collector 1104), additional information associated with the UE 1102, etc. For example, the information related to the ML data service may include one or more ML models for feature extraction (e.g., an ML model ID or an ML model name such as YOLO for feature extraction), sensor types (e.g., camera, radar, lidar, etc.,) or extracted features (e.g., bounding boxes from YOLO) for ML training data service or ML inference data service, one or more ML training models supported (e.g., an ML training model ID or an ML training model name), one or more ML inference models supported (e.g., an ML inference model ID or an ML inference model name), etc., or any combination thereof. In other words, the RRC message transmitted by the UE 1102 may include ML training data service request or ML inference data service request or both implicitly with the indication of ML training data service for ML training data service request or ML inference data service for ML inference data service request or both.

At 1128, after receiving the RRC message (e.g., UE capability or information message or UE assistance information (UAI) message) message from the UE 1102, the base station 1106 may validate the ML data service (e.g., ML training data service or ML inference data service or both) provided by sensor data collector 1104 for UE 1102 and based on the service subscription or service profile (e.g., based on the UE ID or device ID for the UE 1102 or the sensor data collector 1104 respectively) and the information related to the sensor data collector 1104 (e.g., UE context, UE capability, etc. received while establishing an RRC connection) and then transmit or forward ML training data service request or the ML inference data service request or both to the ML training host 1109 or the ML inference host 1108, respectively, where the ML training data service request or the ML inference data service request may include the information related to the ML data service (e.g., ML model ID(s) or ML model names for feature extraction, sensor types or extracted feature types or names for ML training data service or ML inference data service, ML training model IDs or names supported, ML inference model IDs or names supported, etc.) from the sensor data collector 1104 (e.g., the information associated with the vehicle and/or the sensor data collector 1104) for online ML training or near real time ML inference respectively.

At 1130, the ML training host 1109 or the ML inference host 1108 may respond to the ML training data service request or the ML inference data service request via an ML training data service response message or an ML inference data service response message. For example, the ML training data service response message or the ML inference data service response message may indicate whether the ML training host 1109 or the ML inference host 1108 is able to accept the ML training data service or the ML inference data service provided by the sensor data collector 1104 for the UE 1102. If the ML training host 1109 or the ML inference host 1108 is able to take the ML training data service or the ML inference data service, the ML training data service response or the ML inference data service response message may include an acknowledgement for the ML training data service or the ML inference data service with ML host information (e.g., ML training host ID or the ML inference host ID, the ML model ID(s) or name(s) for ML training data service or ML inference data service, supported sensor type(s) or feature type(s) or name(s), etc.), whereas if the ML training host 1109 or the ML inference host 1108 is unable to take the ML training data service or the ML inference data service, the ML training data service repose message or the ML inference data service response message may include a negative-acknowledgement, a reject reason, and/or a cause (e.g., ML model(s) not supported, feature type(s) not supported, etc.) for the ML training data service or the ML inference data service.

At 1132, depending on whether the ML training host 1109 or the ML inference host 1108 is able to accept the ML training data service or the ML inference data service provided the sensor data collector 1104 for the UE 1102, the base station 1106 may inform the UE 1102 with the ML host information received from ML training data service response or ML inference data service, additionally, the configuration for the ML training data service or the ML inference data service. For example, if the ML training host 1109 or the ML inference host 1108 is able to take the ML training data service or the ML inference data service provided by the sensor data collector 1104 for the UE 1102, the base station 1106 may inform the UE 1102 about the configuration for the ML training data service or the configuration for the ML inference data service or both via an RRC configuration message.

In some aspects, the ML training data service request and response and/or the ML inference data service request and response may be conducted separately or jointly. For one example, either the ML training data service request and response for ML training data service or the ML inference data service request and response for ML inference data service may be conducted. For another example, the ML training data service request and response may be conducted initially for ML training data service and then the ML inference data service request and response may be conducted for ML training data service after the ML training procedure and the trained ML inference model is loaded into the ML inference host. For another example, the ML training data service request and response for ML training data service and the ML inference data service request and response for ML inference data service may be conducted jointly (e.g., both ML training data service information and ML inference data service information, both ML training host information and ML inference host information, etc., are included in an ML data service request message and an ML data service response message respectively, where an ML service management entity as shown in FIG. 9 may be used by both ML training host 1109 and ML inference host for processing jointly the ML training data service request and response for ML training data service and the ML inference data service request and response for ML inference data service) so that the ML inference data service may be started after the ML training procedure and the trained ML inference model is loaded into the ML inference host without another procedure for the ML inference data service request or response for ML inference data service.

At 1134, after being informed regarding the acceptance of the ML training data service or the ML inference data service or both via an RRC configuration message as shown at 1132, the UE 1102 may transmit an ML data service response to the sensor data collector 1104 including the configuration for the ML training data service or the ML inference data service.

At 1136, in response to the ML data service response, the sensor data collector 1104 may transmit an ML data service confirmation message to the UE 1102 to confirm the availability of the ML data service such as ML training data service and/or the ML inference data service.

At 1138, the sensor data collector 1104 may establish user plane with the ML training host 1109 or the ML inference host 1108 via the base station 1106, including configuring data radio bearers (DRBs), logical and physical channels, as well as resource configuration for periodic or autonomous transmissions of ML training data or ML inference data to the ML training host 1109 or the ML inference host 1108 via the base station 1106 for the ML training data service or the ML inference data service, respectively, such that the ML training data service or the ML inference data service may be activated or established for the sensor data collector 1104, such as shown at 1140. Then, during the ML training data service or the ML inference data service, the base station 1106 may perform communication management for the UE 1102 based on the ML inference host's prediction which is produced with the ML inference data service provided by the sensing information provided by the sensor data collector 1104 with UE information and information related to the sensor data collector 1104 and sensor data or extracted features from the sensor data.

For example, as shown at 1142, the UE 1102 may transmit updated UE information to the sensor data collector 1104, such as current location, orientation, direction, speed, beam information associated with the UE 1102, where the beam information (e.g., one or more beams or beam pair links for which the UE 1102 currently uses for communicating with the base station 1106, the AoA/AoD for one or more beams, the spatial filter with QCL or TCI state associated with one or more beams, and/or a candidate beam list that may be used by the UE 1102, etc.) may be different from the beam information transmitted at 1114. Similarly, the UE 1102 may transmit the updated UE information to the sensor data collector 1104 via a sidelink message, e.g., a PC5 RRC message such as sidelink UE assistance information message if the UE 1102 and the sensor data collector 1104 are communicating with each other over sidelink. In some examples, the updated UE information may further include one or more beam measurements for one or more beam pairs between the UE 1102 and the base station 1106.

At 1144, the sensor data collector 1104 may transmit training/inference data captured by the vehicle sensors and/or extracted by the ML model of the sensor data collector 1104 to the ML training host 1109 and/or the ML inference host 1108 along with the updated UE information (e.g., via the established user plane), such as described in connection with FIGS. 6 to 9. For example, the sensor data collector 1104 may use a camera to capture the surrounding images of the vehicle (e.g., the vehicle in which the UE 1102 and the sensor data collector 1104 is located), and the ML model of the sensor data collector 1104 may extract one or more features from the surrounding images, such as identifying one or more objects (e.g., cars, trees, pedestrians, buildings, etc.) surrounding the vehicle as described in connection with FIG. 7. Then, the sensor data collector 1104 may transmit the extracted features and the updated UE information received from the UE 1102 at 1142 or the updated UE information collected or measured by the sensor data collector 1104 (e.g., location, direction, speed, etc.) to the ML inference host 1108 as ML inference data or to the ML training host 1009 as ML training data. For example, the inference data transmitted to the ML inference host 1108 or the ML training data transmitted to the ML training host 1009 may include extracted features, location of the vehicle (or the UE 1102), the direction of the vehicle (or the UE 1102), the speed of the vehicle (or the UE 1102), and/or the beam information provided by the UE 1102, etc.

For purposes of the present disclosure, the information associated with the UE 1102 may be referred to as "UE information." Hereafter. In one example, the UE information may include orientation of the UE 1102, which may be referenced from the sensor data collector 1104's frame (e.g., mounted on a charging block, sensed inside the vehicle, etc.), and/or the UE 1102's pedestrian dead-reckoning (PDR) based information (e.g., using gyroscope and accelerometer sensors). In another example, the UE information may include location of the UE 1102, which may be measured at the UE 1102 (e.g., GPS coordination) or referenced from the location (e.g., GPS coordination) of the sensor data collector 1104. In another example, the UE information may include speed of the UE 1102, which may be measured at the UE 1102 or based on the speed of the sensor data collector 1104. In another example, the UE information may include beam information associated with the UE 1102, such as the one or more beam pair links for which the UE 1102 uses for communicating with the base station 1106, the AoA for one or more beams, the AoD for one or more beams, the QCL or TCI state associated with one or more beams, and/or at least one candidate beam that may be used by the UE 1102, etc. Note some of the information included in the ML inference data service request message may be provided by either the UE 1102 or the sensor data collector 1104. For example, the UE 1102 and the sensor data collector 1104 may both have the capability to determine or measure the speed, the orientation, the direction, and/or the location of the vehicle. Thus, information related to the speed, the orientation, the direction, and/or the location of the vehicle may be provided by the sensor data collector 1104 at 1114 and/or measured by the UE 1102.

At 1146, after receiving the inference data from the sensor data collector 1104, the ML inference host 1108 may perform an inference (e.g., a prediction) based on the inference data, and the ML inference host 1108 may transmit the inference output (e.g., the prediction) to the base station 1106. For example, after receiving the extracted features, the orientation, the location, the direction, and/or speed of the vehicle (or the UE 1102), and the beam information between the UE 1102 and the base station 1106 from the sensor data collector 1104, the ML inference host 1108 may predict whether the communication between the UE 1102 and the base station 1106 may be improved by switching to one or more different beam pairs or changing one or more communication parameters (e.g., the transmission power, direction, periodicity, duration, etc.). Then, the ML inference host 1108 may inform the base station 1106 regarding its prediction. For example, if the ML inference host 1108 predicts that the communication between the UE 1102 and the base station 1106 may be improved by using beam pair X because the current beam pair Y used by the UE 1102 and the base station 1106 may experience a blockage (e.g., the extracted feature indicates there is a truck in between as shown by FIG. 6), the ML inference host 1108 may transmit a beam prediction to the base station 1106 indicating the base station 1106 to use the beam pair X.

At 1148, after receiving the inference (e.g., the prediction) from the ML inference host 1108, the base station 1106 may determine whether to act based on the inference (e.g., whether to apply prediction suggested by the ML inference host 1108).

At 1150, if the base station 1106 determines to act based on the inference (e.g., the base station 1106 adopts/accepts the prediction provided by the ML inference host 1108), the base station 1106 may transmit an indication or a configuration to the UE 1102 to indicate/configure one or more communication parameters or beams or to switch beams for the UE 1102. For example, if the inference from the ML inference host 1108 predicts that the communication between the base station 1106 and the UE 1102 may be improved by using (e.g., switching to) the beam pair X, the base station 1106 may transmit a beam indication/configuration/adjustment message to the UE 1102 to indicate/configure/adjust the UE 1102 to use the beam pair X. In one example, the base station 1106 may transmit the indication or the configuration via an RRC message (e.g., for reconfiguration), the indication or an adjustment via a medium access control (MAC)-control element (MAC-CE) (e.g., for activation), or an adjustment via downlink control information (DCI) (e.g., for signaling). On the other hand, if the base station 1106 determines not to act based on the inference, the base statin 1106 may ignore the inference output (e.g., no configuration will be transmitted to the UE 1102 at 1150).

After receiving the indication/configuration/adjustment from the base station 1106 for the communication between the UE 1102 and the base station 1106, the UE 1102 may adjust the current beams or candidate beam list based on the received indication/configuration/adjustment and communicate with the base station 1106 based on the adjusted beams. In some examples, after the UE 1102 adjusts the current beams or candidate beam list per the indication/configuration/adjustment, the UE 1102 may perform one or more measurements for the communication, such as beam measurements, and the UE 1102 may report the measurements to the sensor data collector 1104 (e.g., at 1142), where the measurements may be forwarded to the ML inference host 1108 for ML inference model performance monitoring. In some examples, the UE 1102 may also transmit the measurements directly to the ML training host 1109 (e.g., the model training host 502). Based at least in part on the measurements, the ML training host 1109 may determine whether to retrain or configure the ML inference host 1108, such as described in connection with FIG. 5.

As such, aspects described in connection with FIGS. 6 to 11 may enable one or more network entities (e.g., a base station, a UE) to utilize sensing information provided by a sensor device (which may be not be a network entity) for improving wireless communication between the network entities.

Figure 12:
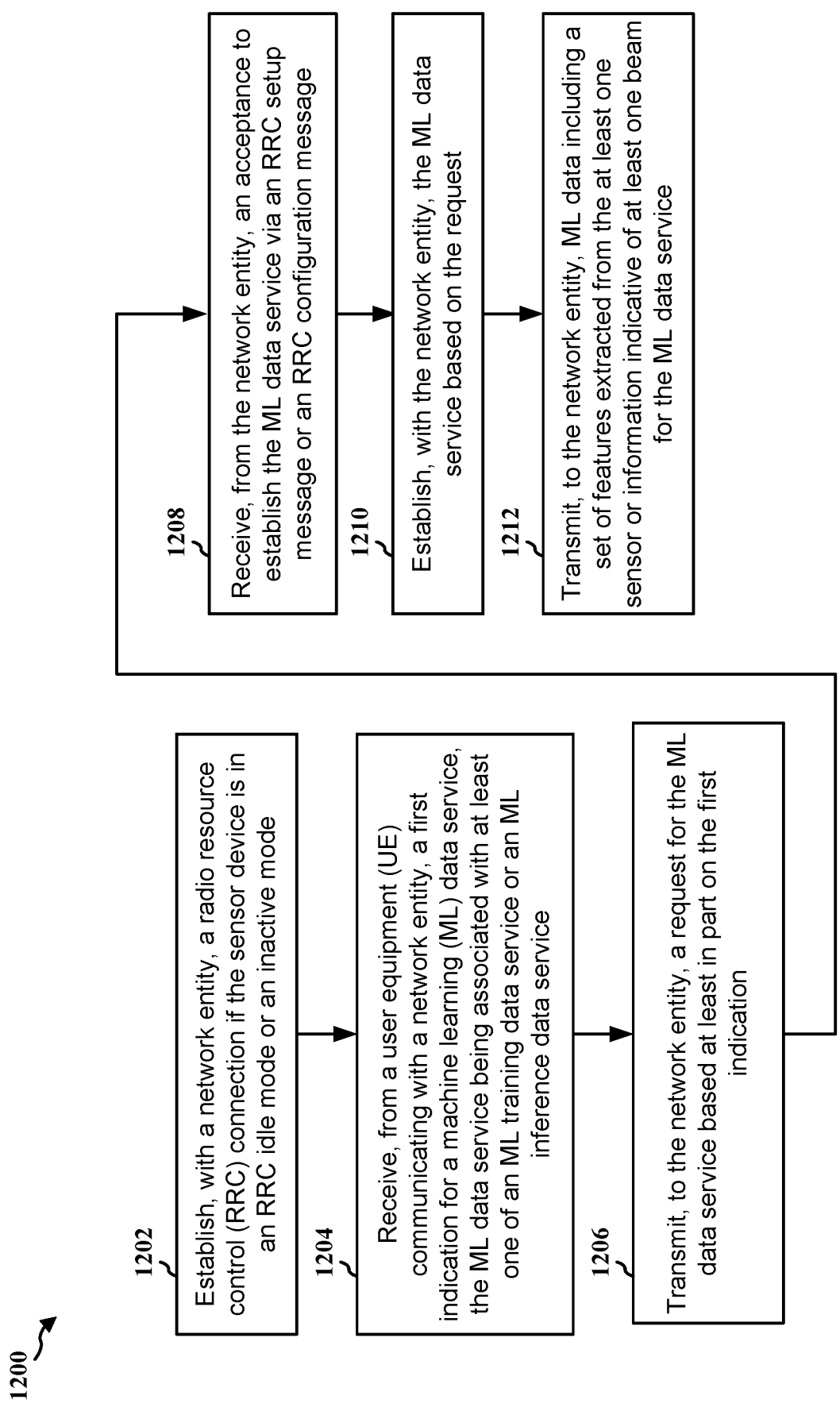
FIG. 12 is a flowchart of a method of wireless communication in accordance with various aspects of the present disclosure.

FIG. 12 is a flowchart 1200 of a method of wireless communication. The method may be performed by a sensor device or a component of a sensor device (e.g., the UE 104, 350; the sensor device 604; the sensor data collector 1004; the apparatus 1402; a processing system, which may include the memory 360 and which may be the entire UE 350 or a component of the UE 350, such as the TX processor 368, the RX processor 356, and/or the controller/processor 359). The method may enable the sensor device, which may be a UE itself, to provide sensing information based on its sensors to a base station or an ML inference host associated with the base station for improving the communication between the base station and another UE (e.g., an in-vehicle/end user UE) that may be in proximity with the sensor device.

At 1202, the sensor device may establish, with the network entity, an RRC connection if the sensor device is in an RRC idle mode or an inactive mode, such as described in connection with FIG. 10. For example, at 1012, the sensor data collector 1004 may establish, with the base station

1006, an RRC connection if the sensor data collector 1004 is in an RRC idle mode or an inactive mode. The establishment of the RRC connection may be performed by, e.g., the RRC connection request component 1440, the transmission component 1434, and/or the reception component 1430 of the apparatus 1402 in FIG. 14.

At 1204, the sensor device may receive, from a UE communicating with a network entity, a first indication for an ML data service, the ML data service being associated with at least one of an ML training data service or an ML inference data service, such as described in connection with FIG. 10. For example, at 1014, the sensor data collector 1004 may receive, from the UE 1002, a sidelink message including an indication or a request for ML data service such as ML training data service or ML inference data service or both, and information associated with the UE 1002. The reception of the first indication for an ML data service may be performed by, e.g., the ML data service process component 1442 and/or the reception component 1430 of the apparatus 1402 in FIG. 14.

In one example, the first indication may include at least one of: UE information including a UE ID or a device ID, or the request for the ML data service that includes the ML training data service or the ML inference data service or both.

In another example, the network entity may be a RAN that includes at least one of: a base station, a CU of the base station, a DU of the base station, or an RU of the base station, an ML training host, or an inference host. In such an example, the inference host may include at least an ML inference model for beam prediction based at least in part on the ML inference data.

At 1206, the sensor device may transmit, to the network entity, a request for the ML data service based at least in part on the first indication, such as described in connection with FIG. 10. For example, at 1016 or 1026, the sensor data collector 1004 may transmit, to the base station 1006, a request for an ML data service that is based at least in part on the sidelink message received at 1014. The transmission of the request for an ML data service may be performed by, e.g., the ML data service request component 1444 and/or the transmission component 1434 of the apparatus 1402 in FIG. 14.

In one example, the request for the ML data service may include a first information associated with at least an ML model for feature extraction, the ML training data service, the ML inference data service, or a second information associated with the at least one sensor or the set of features extracted from the at least one sensor.

In another example, the request for the ML data service may be transmitted to the network entity via an RRC message that includes at least one of: an RRC setup request message, a UE information message, or a UE assistance information message.

At 1208, the sensor device may receive, from the network entity, an acceptance to establish the ML data service via an RRC setup message or an RRC configuration message, such as described in connection with FIG. 10. For example, at 1022 or 1032, the sensor data collector 1004 may receive, from the base station 1006, an acceptance or confirmation to establish the ML data service via an RRC setup message or an RRC configuration message. The reception of the acceptance to establish the ML data service may be performed by, e.g., the ML data service confirmation component 1446 and/or the reception component 1430 of the apparatus 1402 in FIG. 14.

At 1210, the sensor device may establish, with the network entity, the ML data service based on the request, such as described in connection with FIG. 10. For example, at 1038, the sensor data collector 1004 may establish, with the base station 1006, a PDU session for the ML data service based on the ML data service request. The establishment of the ML data service may be performed by, e.g., the PDU session establishment component 1448, the transmission component 1434, and/or the reception component 1430 of the apparatus 1402 in FIG. 14.

In one example, the sensor device may transmit, to the UE, a second indication for the establishment of the ML data service base on the first indication; receive, from the UE, an acknowledgement for the establishment of the ML data service based on the second indication; and receive, from the UE, additional beam information for the ML data service, where the at least one beam is modified further based on the additional beam information.

At 1212, the sensor device may transmit, to the network entity, ML data including a set of features extracted from the at least one sensor or information indicative of at least one beam for the ML data service, such as described in connection with FIG. 10. For example, at 1044, the sensor data collector 1004 may transmit, to the ML inference host 1008 that is associated with the base station 1006, ML inference data including a set of features extracted from the at least one sensor of the sensor data collector 1004, or information associated with the UE 1002. The transmission of the ML data may be performed by, e.g., the ML inference data process component 1450 and/or the transmission component 1434 of the apparatus 1402 in FIG. 14.

In one example, the at least one sensor may include: a camera, a radar sensor, a lidar sensor, or a distance sensor.

In another example, the information indicative of the at least one beam may include at least one of: a beam measurement for the at least one beam, an AoA measurement for the at least one beam, an AoD measurement for the at least one beam, a QCL or TCI state for the at least one beam, or one or more candidate beams for communicating with the network entity.

In another example, the information indicative of the at least one beam may further include at least one of an orientation of the sensor device or the UE, a direction of the sensor device or the UE, a speed of the sensor device or the UE, or a location of the sensor device or the UE.

In another example, the information indicative of the at least one beam may be received via at least one of SL communications: Bluetooth communication, Wi-Fi communication, or PC-5 communication.

Figure 13:
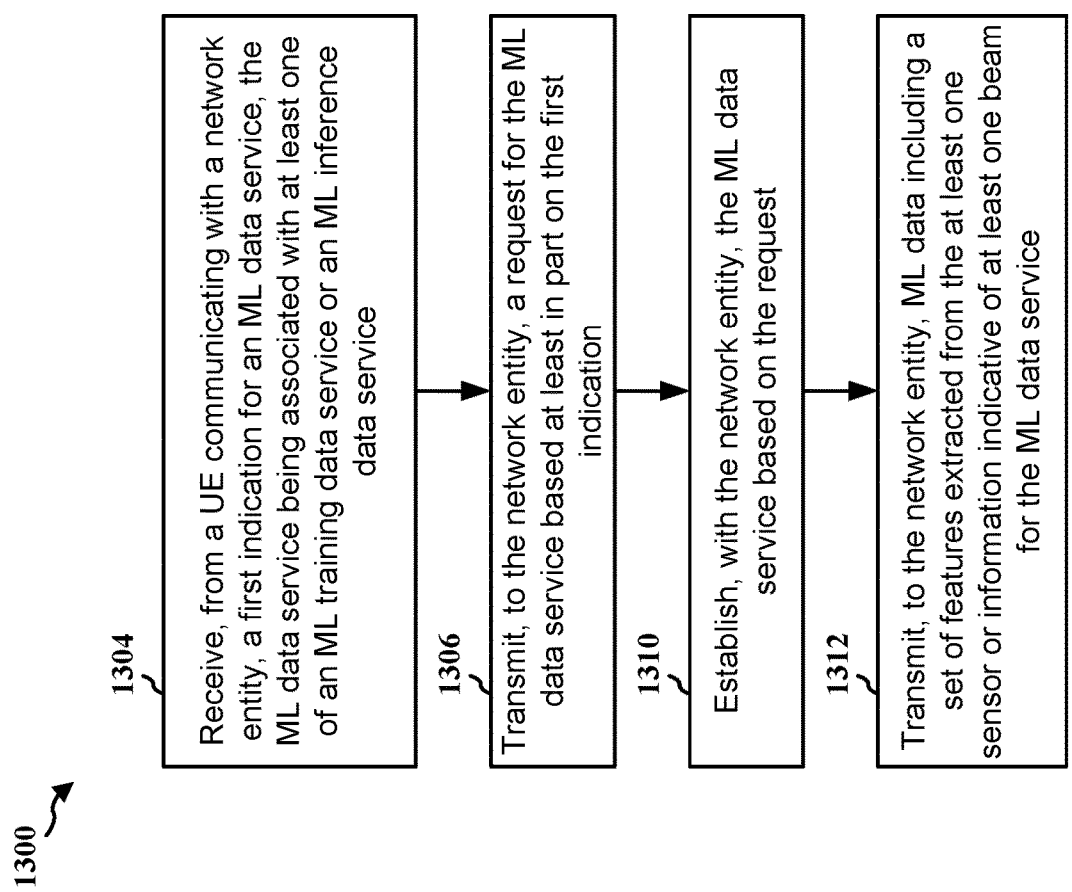
FIG. 13 is a flowchart of a method of wireless communication in accordance with various aspects of the present disclosure.

FIG. 13 is a flowchart 1300 of a method of wireless communication. The method may be performed by a sensor device or a component of a sensor device (e.g., the UE 104, 350; the sensor device 604; the sensor data collector 1004; the apparatus 1402; a processing system, which may include the memory 360 and which may be the entire UE 350 or a component of the UE 350, such as the TX processor 368, the RX processor 356, and/or the controller/processor 359). The method may enable the sensor device, which may be a UE itself, to provide sensing information based on its sensors to a base station or an ML inference host associated with the base station for improving the communication between the base station and another UE (e.g., an in-vehicle/end user UE) that may be in proximity with the sensor device.

In one example, the sensor device may establish, with the network entity, an RRC connection if the sensor device is in an RRC idle mode or an inactive mode, such as described in connection with FIG. 10. For example, at 1012, the sensor data collector 1004 may establish, with the base station 1006, an RRC connection if the sensor data collector 1004 is in an RRC idle mode or an inactive mode. The establishment of the RRC connection may be performed by, e.g., the RRC connection request component 1440, the transmission component 1434, and/or the reception component 1430 of the apparatus 1402 in FIG. 14.

At 1304, the sensor device may receive, from a UE communicating with a network entity, a first indication for an ML data service, the ML data service being associated with at least one of an ML training data service or an ML inference data service, such as described in connection with FIG. 10. For example, at 1014, the sensor data collector 1004 may receive, from the UE 1002, a sidelink message including an indication or a request for ML data service such as ML training data service or ML inference data service or both, and information associated with the UE 1002. The reception of the first indication for an ML data service may be performed by, e.g., the ML data service process component 1442 and/or the reception component 1430 of the apparatus 1402 in FIG. 14.

In one example, the first indication may include at least one of: UE information including a UE ID or a device ID, or the request for the ML data service that includes the ML training data service or the ML inference data service or both.

In another example, the network entity may be a RAN that includes at least one of: a base station, a CU of the base station, a DU of the base station, or an RU of the base station, an ML training host, or an inference host. In such an example, the inference host may include at least an ML inference model for beam prediction based at least in part on the ML inference data.

At 1306, the sensor device may transmit, to the network entity, a request for the ML data service based at least in part on the first indication, such as described in connection with FIG. 10. For example, at 1016 or 1026, the sensor data collector 1004 may transmit, to the base station 1006, a request for an ML data service that is based at least in part on the sidelink message received at 1014. The transmission of the request for an ML data service may be performed by, e.g., the ML data service request component 1444 and/or the transmission component 1434 of the apparatus 1402 in FIG. 14.

In one example, the request for the ML data service may include a first information associated with at least an ML model for feature extraction, the ML training data service, the ML inference data service, or a second information associated with the at least one sensor or the set of features extracted from the at least one sensor.

In another example, the request for the ML data service may be transmitted to the network entity via an RRC message that includes at least one of: an RRC setup request message, a UE information message, or a UE assistance information message. In such an example, the sensor device may receive, from the network entity, an acceptance to establish the ML data service via an RRC setup message or an RRC configuration message, such as described in connection with FIG. 10. For example, at 1022 or 1032, the sensor data collector 1004 may receive, from the base station 1006, an acceptance or confirmation to establish the ML data service via an RRC setup message or an RRC configuration message. The reception of the acceptance to establish the ML data service may be performed by, e.g., the ML data service confirmation component 1446 and/or the reception component 1430 of the apparatus 1402 in FIG. 14.

At 1310, the sensor device may establish, with the network entity, the ML data service based on the request, such as described in connection with FIG. 10. For example, at 1038, the sensor data collector 1004 may establish, with the base station 1006, a PDU session for the ML data service based on the ML data service request. The establishment of the ML data service may be performed by, e.g., the PDU session establishment component 1448, the transmission component 1434, and/or the reception component 1430 of the apparatus 1402 in FIG. 14.

In one example, the sensor device may transmit, to the UE, a second indication for the establishment of the ML data service base on the first indication; receive, from the UE, an acknowledgement for the establishment of the ML data service based on the second indication; and receive, from the UE, additional beam information for the ML data service, where the at least one beam is modified further based on the additional beam information.

At 1312, the sensor device may transmit, to the network entity, ML data including a set of features extracted from the at least one sensor or information indicative of at least one beam for the ML data service, such as described in connection with FIG. 10. For example, at 1044, the sensor data collector 1004 may transmit, to the ML inference host 1008 that is associated with the base station 1006, ML inference data including a set of features extracted from the at least one sensor of the sensor data collector 1004, or information associated with the UE 1002. The transmission of the ML data may be performed by, e.g., the ML inference data process component 1450 and/or the transmission component 1434 of the apparatus 1402 in FIG. 14.

In one example, the at least one sensor may include: a camera, a radar sensor, a lidar sensor, or a distance sensor.

In another example, the information indicative of the at least one beam may include at least one of: a beam measurement for the at least one beam, an AoA measurement for the at least one beam, an AoD measurement for the at least one beam, a QCL or TCI state for the at least one beam, or one or more candidate beams for communicating with the network entity.

In another example, the information indicative of the at least one beam may further include at least one of an orientation of the sensor device or the UE, a direction of the sensor device or the UE, a speed of the sensor device or the UE, or a location of the sensor device or the UE.

In another example, the information indicative of the at least one beam may be received via at least one of SL communications: Bluetooth communication, Wi-Fi communication, or PC-5 communication.

Figure 14:
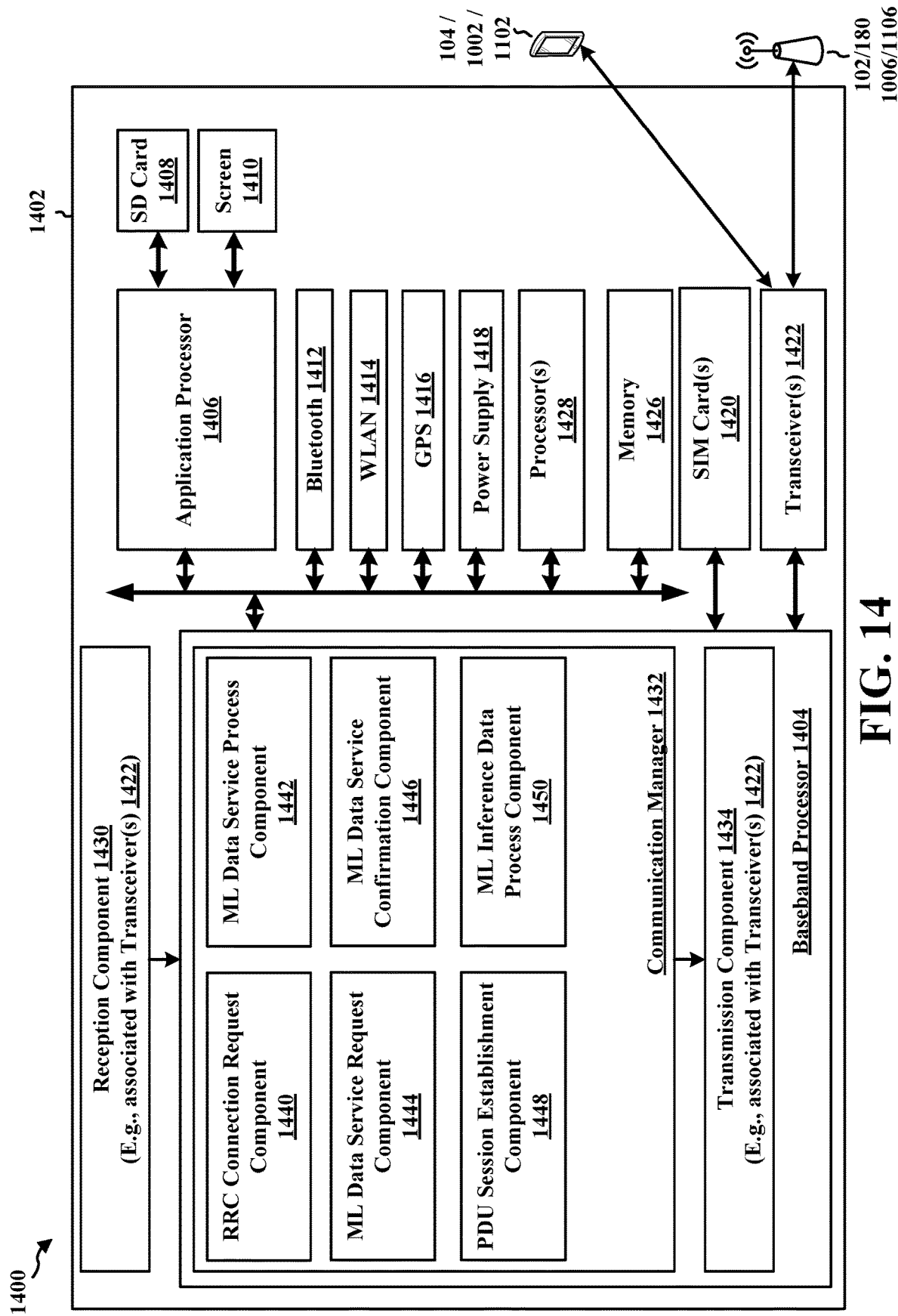
FIG. 14 is a diagram illustrating an example of a hardware implementation for an example apparatus in accordance with various aspects of the present disclosure.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a baseband processor 1404 (also referred to as a modem) coupled to at least one transceiver 1422 (e.g., one or more RF transceivers and/or antennas). The at least one transceiver 1422 may be associated with or include a reception component 1430 and/or a transmission component 1434. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The baseband processor 1404 communicates through the at least one transceiver 1422 with the BS 102/180 and/or another UE. The baseband processor 1404 may include a computer-readable medium/memory (e.g., a memory 1426). The computer-readable medium/memory may be non-transitory. The baseband processor 1404 and/or at least one processor 1428 is responsible for general processing, including the execution of software stored on the computer-readable medium/memory. The software, when executed by the baseband processor 1404 and/or the at least one processor 1428, causes the baseband processor 1404 and/or the at least one processor 1428 to perform the various functions described supra. The computer-readable medium/memory may also be used for storing data that is manipulated by the baseband processor 1404 when executing software. The baseband processor 1404 further includes the reception component 1430, a communication manager 1432, and the transmission component 1434. The reception component 1430 and the transmission component 1434 may, in a non-limiting example, include at least one transceiver and/or at least one antenna subsystem. The communication manager 1432 includes the one or more illustrated components. The components within the communication manager 1432 may be stored in the computer-readable medium/memory and/or configured as hardware within the baseband processor 1404. The baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes an RRC connection request component 1440 that is configured to establish, with the network entity, an RRC connection if the sensor device is in an RRC idle mode or an inactive mode, e.g., as described in connection with 1202 of FIG. 12. The communication manager 1432 further includes an ML data service process component 1442 that is configured to receive, from a UE communicating with a network entity, a first indication for an ML data service, the ML data service being associated with at least one of an ML training data service or an ML inference data service, e.g., as described in connection with 1204 of FIGS. 12 and/or 1304 of FIG. 13. The communication manager 1432 further includes an ML data service request component 1444 that is configured to transmit, to the network entity, a request for the ML data service based at least in part on the first indication, e.g., as described in connection with 1206 of FIGS. 12 and/or 1306 of FIG. 13. The communication manager 1432 further includes an ML data service confirmation component 1446 that is configured to receive, from the network entity, an acceptance to establish the ML data service via an RRC setup message or an RRC configuration message, e.g., as described in connection with 1208 of FIG. 12. The communication manager 1432 further includes a PDU session establishment component 1448 that is configured to establish, with the network entity, the ML data service based on the request, e.g., as described in connection with 1210 of FIGS. 12 and/or 1310 of FIG. 13. The communication manager 1432 further includes an ML inference data process component 1450 that is configured to transmit, to the network entity, ML data including a set of features extracted from the at least one sensor or information indicative of at least one beam for the ML data service, e.g., as described in connection with 1212 of FIGS. 12 and/or 1312 of FIG. 13.

The apparatus may include additional components that perform each of the blocks of the algorithm in the flowcharts of FIGS. 12 and 13. As such, each block in the flowcharts of FIGS. 12 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband processor 1404, includes means for establishing, with the network entity, an RRC connection if the sensor device is in an RRC idle mode or an inactive mode (e.g., the RRC connection request component 1440, the transmission component 1434, and/or the reception component 1430). The apparatus 1402 includes means for receiving, from a UE communicating with a network entity, a first indication for an ML data service, the ML data service being associated with at least one of an ML training data service or an ML inference data service (e.g., the ML data service process component 1442 and/or the reception component 1430). The apparatus 1402 includes means for transmitting, to the network entity, a request for the ML data service based at least in part on the first indication (e.g., the ML data service request component 1444 and/or the transmission component 1434). The apparatus 1402 includes means for receiving, from the network entity, an acceptance to establish the ML data service via an RRC setup message or an RRC configuration message (e.g., the ML data service confirmation component 1446 and/or the reception component 1430). The apparatus 1402 includes means for establishing, with the network entity, the ML data service based on the request (e.g., the PDU session establishment component 1448, the transmission component 1434, and/or the reception component 1430). The apparatus 1402 includes means for transmitting, to the network entity, ML data including a set of features extracted from the at least one sensor or information indicative of at least one beam for the ML data service (e.g., the ML inference data process component 1450 and/or the transmission component 1434).

In one configuration, the first indication may include at least one of: UE information including a UE ID or a device ID, or the request for the ML data service that includes the ML training data service or the ML inference data service or both.

In another configuration, the network entity may be a RAN that includes at least one of: a base station, a CU of the base station, a DU of the base station, or an RU of the base station, an ML training host, or an inference host. In such an configuration, the inference host may include at least an ML inference model for beam prediction based at least in part on the ML inference data.

In another configuration, the request for the ML data service may include a first information associated with at least an ML model for feature extraction, the ML training data service, the ML inference data service, or a second information associated with the at least one sensor or the set of features extracted from the at least one sensor.

In another configuration, the request for the ML data service may be transmitted to the network entity via an RRC message that includes at least one of: an RRC setup request message, a UE information message, or a UE assistance information message.

In another configuration, the apparatus 1402 includes means for transmitting, to the UE, a second indication for the establishment of the ML data service base on the first indication; means for receiving, from the UE, an acknowledgement for the establishment of the ML data service based on the second indication; and means for receiving, from the UE, additional beam information for the ML data service, where the at least one beam is modified further based on the additional beam information.

In another configuration, the at least one sensor may include: a camera, a radar sensor, a lidar sensor, or a distance sensor.

In another configuration, the information indicative of the at least one beam may include at least one of: a beam measurement for the at least one beam, an AoA measurement for the at least one beam, an AoD measurement for the at least one beam, a QCL or TCI state for the at least one beam, or one or more candidate beams for communicating with the network entity.

In another configuration, the information indicative of the at least one beam may further include at least one of an orientation of the sensor device or the UE, a direction of the sensor device or the UE, a speed of the sensor device or the UE, or a location of the sensor device or the UE.

In another configuration, the information indicative of the at least one beam may be received via at least one of SL communications: Bluetooth communication, Wi-Fi communication, or PC-5 communication.

The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
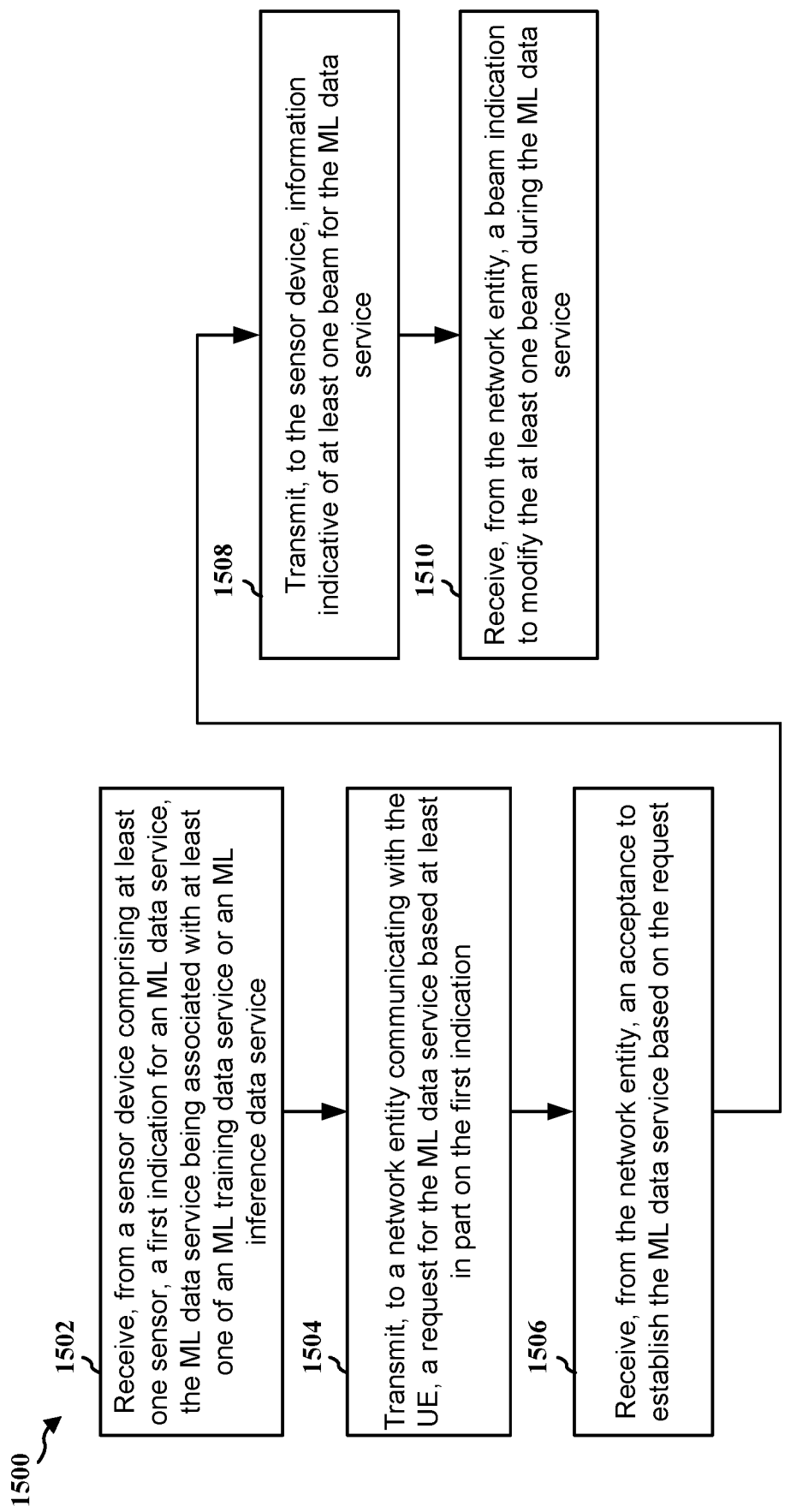
FIG. 15 is a flowchart of a method of wireless communication in accordance with various aspects of the present disclosure.

FIG. 15 is a flowchart 1500 of a method of wireless communication. The method may be performed by a UE or a component of a UE (e.g., the UE 104, 350, 608, 1102; the apparatus 1402; a processing system, which may include the memory 360 and which may be the entire UE 350 or a component of the UE 350, such as the TX processor 368, the RX processor 356, and/or the controller/processor 359). The method may enable the UE to improve its communication with a base station by leveraging sensing information provided by a sensor device that is in proximity with the UE.

At 1502, the UE may receive, from a sensor device including at least one sensor, a first indication for an ML data service, the ML data service being associated with at least one of an ML training data service or an ML inference data service, such as described in connection with FIG. 11. For example, at 1114, the UE 1102 may receive, from the sensor data collector 1104, a sidelink message including an indication for ML data service such as ML training data service or ML inference data service or both, and information associated with the vehicle and/or the sensor data collector 1104. The reception of the first indication for an ML data service may be performed by, e.g., the ML data service process component 1640 and/or the reception component 1630 of the apparatus 1602 in FIG. 16.

In one example, the first indication may include at least one of: UE information including a UE ID or a device ID, or the request for the ML data service that includes the ML training data service or the ML inference data service or both.

In another example, the first indication may be received via at least one of SL direct communications: Bluetooth communication, Wi-Fi communication, or PC-5 communication.

At 1504, the UE may transmit, to a network entity communicating with the UE, a request for the ML data service based at least in part on the indication, such as described in connection with FIG. 11. For example, at 1126, the UE 1102 may transmit, to the base station 1106, a request for an ML data service based at least in part on the sidelink message received from the sensor data collector 1104. The transmission of the request for an ML data service may be performed by, e.g., the ML data service request component 1642 and/or the transmission component 1634 of the apparatus 1602 in FIG. 16.

In one example, the network entity may be a RAN that includes at least one of: a base station, a CU of the base station, a DU of the base station, an RU of the base station, an ML training host, or an ML inference host.

In another example, the UE may establish, with the network entity, an RRC connection with beam forming.

In another example, the request for the ML data service may include a first information associated with at least an ML model for feature extraction, the ML training data service, the ML inference data service, or a second information associated with the at least one sensor or a set of features extracted from the at least one sensor. In such an example, the request may be transmitted to the network entity via a UE information message or a UE assistance information message, and the acceptance to establish the ML data service may be received via an RRC configuration message.

At 1506, the UE may receive, from the network entity, an acceptance to establish the ML data service based on the request, such as described in connection with FIG. 11. For example, at 1132, the UE 1102 may receive, from the base station 1106, an acceptance to establish an ML data service based on the request. The reception of the acceptance to establish an ML data service may be performed by, e.g., the ML data service acceptance process component 1644 and/or the reception component 1630 of the apparatus 1602 in FIG. 16.

In one example, the UE may transmit, to the sensor device, a second indication for the establishment of the ML data service based on the first indication; receive, from the sensor device, an acknowledgement for the establishment of the ML data service based on the second indication; and transmit, to the sensor device, additional beam information for the ML data service, where the beam indication is further based on the additional beam information.

At 1508, the UE may transmit, to the sensor device, information indicative of at least one beam for the ML data service, such as described in connection with FIG. 11. For example, at 1142, the UE 1102 may transmit, to the sensor data collector 1104, information indicative of at least one beam for the ML data service. The transmission of the information indicative of at least one beam for the ML data service may be performed by, e.g., the beam information component 1648 and/or the transmission component 1634 of the apparatus 1602 in FIG. 16.

In one example, the information indicative of the at least one beam includes at least one of: a beam measurement for the at least one beam, an AoA measurement for the at least one beam, an AoD measurement for the at least one beam, a QCL or TCI state for the at least one beam, or one or more candidate beams for communicating with the network entity.

At 1510, the UE may receive, from the network entity, a beam indication to modify the at least one beam during the ML data service, such as described in connection with FIG. 11. For example, at 1150, the UE 1102 may receive, from the base station 1106, a beam indication to modify at least one beam during the ML data service. The reception of the beam indication may be performed by, e.g., the beam modification process component 1646 and/or the reception component 1630 of the apparatus 1602 in FIG. 16.

In one example, beam indication is received via an RRC message for reconfiguration, a MAC-CE for activation, or DCI for signaling.

Figure 16:
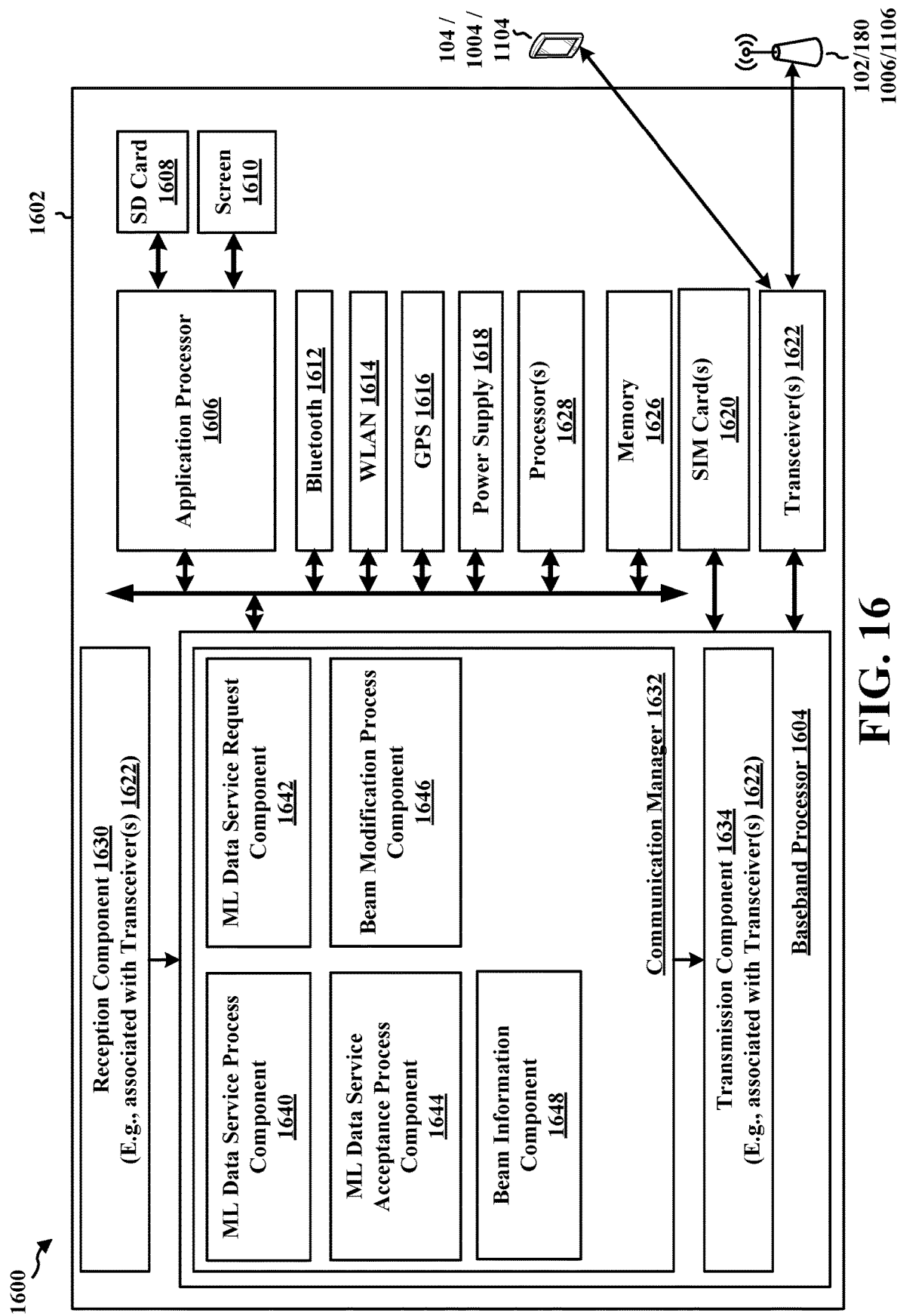
FIG. 16 is a diagram illustrating an example of a hardware implementation for an example apparatus in accordance with various aspects of the present disclosure.

FIG. 16 is a diagram 1600 illustrating an example of a hardware implementation for an apparatus 1602. The apparatus 1602 may be a UE, a component of a UE, or may implement UE functionality. In some aspects, the apparatus 1602 may include a baseband processor 1604 (also referred to as a modem) coupled to at least one transceiver 1622 (e.g., one or more RF transceivers and/or antennas). The at least one transceiver 1622 may be associated with or include a reception component 1630 and/or a transmission component 1634. In some aspects, the apparatus 1602 may further include one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, or a power supply 1618. The baseband processor 1604 communicates through the at least one transceiver 1622 with the BS 102/180 or another UE. The baseband processor 1604 may include a computer-readable medium/memory (e.g., a memory 1626). The computer-readable medium/memory may be non-transitory. The baseband processor 1604 and/or at least one processor 1628 is responsible for general processing, including the execution of software stored on the computer-readable medium/memory. The software, when executed by the baseband processor 1604 and/or the at least one processor 1628, causes the baseband processor 1604 and/or the at least one processor 1628 to perform the various functions described supra. The computer-readable medium/memory may also be used for storing data that is manipulated by the baseband processor 1604 when executing software. The baseband processor 1604 further includes the reception component 1630, a communication manager 1632, and the transmission component 1634. The reception component 1630 and the transmission component 1634 may, in a non-limiting example, include at least one transceiver and/or at least one antenna subsystem. The communication manager 1632 includes the one or more illustrated components. The components within the communication manager 1632 may be stored in the computer-readable medium/memory and/or configured as hardware within the baseband processor 1604. The baseband processor 1604 may be a component of the UE 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire UE (e.g., see 350 of FIG. 3) and include the additional modules of the apparatus 1602.

The communication manager 1632 includes an ML data service process component 1640 that is configured to receive, from a sensor device including at least one sensor, a first indication for an ML data service, the ML data service being associated with at least one of an ML training data service or an ML inference data service, e.g., as described in connection with 1502 of FIG. 15. The communication manager 1632 further includes an ML data service request component 1642 that is configured to transmit, to a network entity communicating with the UE, a request for the ML data service based at least in part on the indication, e.g., as described in connection with 1504 of FIG. 15. The communication manager 1632 further includes an ML data service acceptance process component 1644 that is configured to receive, from the network entity, an acceptance to establish the ML data service based on the request, e.g., as described in connection with 1506 of FIG. 15. The communication manager 1632 further includes a beam information component 1648 that is configured to transmit, to the sensor device, information indicative of at least one beam for the ML data service, e.g., as described in connection with 1508 of FIG. 15. The communication manager 1632 further includes a beam modification process component 1646 that is configured to receive, from the network entity, a beam indication to modify the at least one beam during the ML data service, e.g., as described in connection with 1510 of FIG. 15.

The apparatus may include additional components that perform each of the blocks of the algorithm in the flowchart of FIG. 15. As such, each block in the flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband processor 1604, includes means for receiving, from a sensor device including at least one sensor, a first indication for an ML data service, the ML data service being associated with at least one of an ML training data service or an ML inference data service (e.g., the ML data service process component 1640 and/or the reception component 1630). The apparatus 1602 includes means for transmitting, to a network entity communicating with the UE, a request for the ML data service based at least in part on the first indication (e.g., the ML data service request component 1642 and/or the transmission component 1634). The apparatus 1602 includes means for receiving, from the network entity, an acceptance to establish the ML data service based on the request (e.g., the ML data service acceptance process component 1644 and/or the reception component 1630). The apparatus 1602 includes means for transmitting, to the sensor device, information indicative of at least one beam for the ML data service (e.g., the beam information component 1648 and/or the transmission component 1634). The apparatus 1602 includes means for receiving, from the network entity, a beam indication to modify the at least one beam during the ML data service (e.g., the beam modification process component 1646 and/or the reception component 1630).

In one configuration, the first indication may include at least one of: UE information including a UE ID or a device ID, or the request for the ML data service that includes the ML training data service or the ML inference data service or both.

In another configuration, the first indication may be received via at least one of SL direct communications: Bluetooth communication, Wi-Fi communication, or PC-5 communication.

In another configuration, the network entity may be a RAN that includes at least one of: a base station, a CU of the base station, a DU of the base station, an RU of the base station, an ML training host, or an ML inference host.

In another configuration, the apparatus 1602 includes means for establishing, with the network entity, an RRC connection with beam forming.

In another configuration, the request for the ML data service may include a first information associated with at least an ML model for feature extraction, the ML training data service, the ML inference data service, or a second information associated with the at least one sensor or a set of features extracted from the at least one sensor. In such an configuration, the request may be transmitted to the network entity via a UE information message or a UE assistance information message, and the acceptance to establish the ML data service may be received via an RRC configuration message.

In another configuration, the apparatus 1602 includes means for transmitting, to the sensor device, a second indication for the establishment of the ML data service based on the first indication; means for receiving, from the sensor device, an acknowledgement for the establishment of the ML data service based on the second indication; and means for transmitting, to the sensor device, additional beam information for the ML data service, where the beam indication is further based on the additional beam information.

In another configuration, the information indicative of the at least one beam includes at least one of: a beam measurement for the at least one beam, an AoA measurement for the at least one beam, an AoD measurement for the at least one beam, a QCL or TCI state for the at least one beam, or one or more candidate beams for communicating with the network entity.

In another configuration, beam indication is received via an RRC message for reconfiguration, a MAC-CE for activation, or DCI for signaling.

The means may be one or more of the components of the apparatus 1602 configured to perform the functions recited by the means. As described supra, the apparatus 1602 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 17:
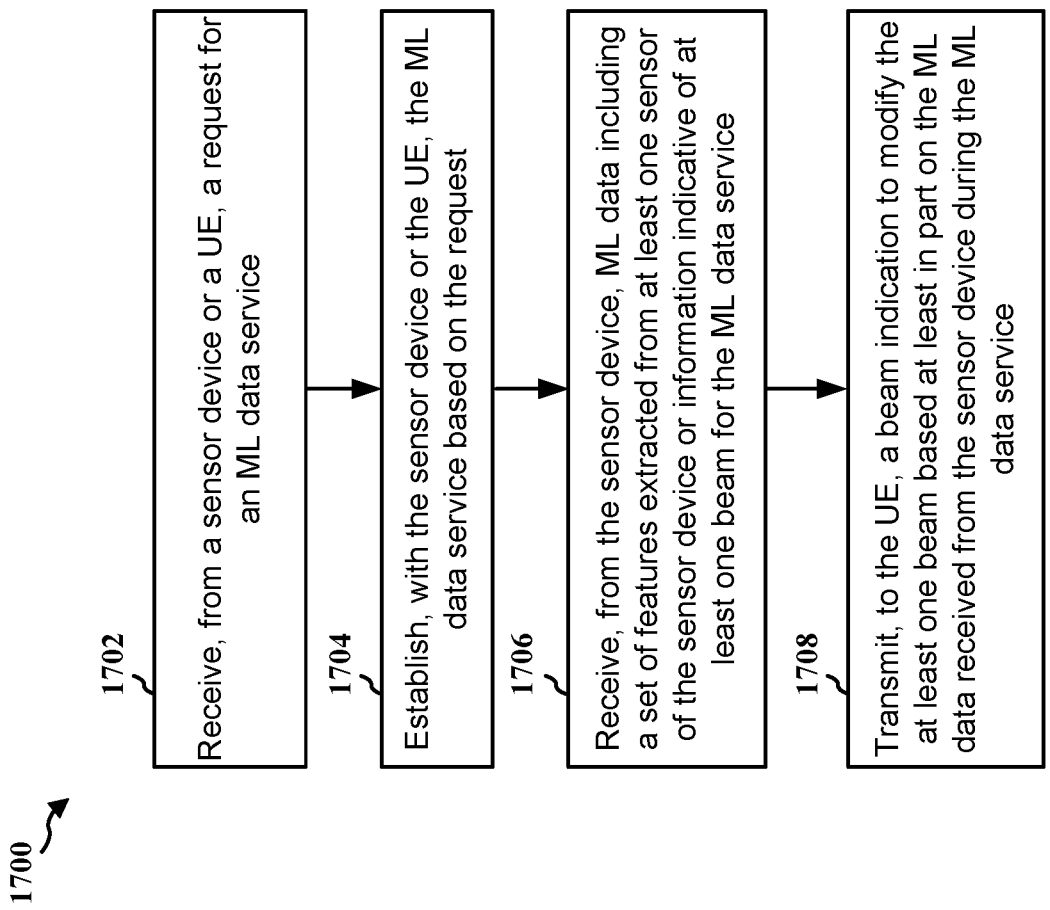
FIG. 17 is a flowchart of a method of wireless communication in accordance with various aspects of the present disclosure.

FIG. 17 is a flowchart 1700 of a method of wireless communication. The method may be performed by a network entity or a component of a network entity (e.g., the base station 102, 170, 310, 606, 1006, 1106; the apparatus 1802; a processing system, which may include the memory 376 and which may be the entire base station 310 or a component of the base station 310, such as the TX processor 316 the RX processor 370, and/or the controller/processor 375). The method may enable the network entity, such as a base station that is associated with an ML inference host, to improve its communication with a UE by leveraging sensing information provided by a sensor device that is in proximity with the UE.

At 1702, the network entity may receive, from a sensor device or a UE, a request for an ML data service, such as described in connection with FIGS. 10 and 11. For example, at 1016 or 1026, the base station 1006 may receive, from the sensor data collector 1004, a request for an ML data service. The reception of the request for an ML data service may be performed by, e.g., the ML data service request process component 1840 and/or the reception component 1830 of the apparatus 1802 in FIG. 18.

In one example, the network entity may establish, with the sensor device, an RRC connection if the sensor device is in an RRC idle mode or an inactive mode.

In another example, the request for the ML data service may include a first information associated with at least an ML model for feature extraction, an ML training data service, an ML inference data service, or a second information associated with the at least one sensor or the set of features extracted from the at least one sensor.

In another example, the request for the ML data service may be received via an RRC setup request message from the sensor device or a UE information message from the sensor device or the UE.

In another example, the network entity may be a RAN that includes at least one of: a base station, a CU of the base station, a DU of the base station, an RU of the base station, an ML training host, or an ML inference host.

In another example, the request for the ML data service may include information associated with at least an ML model for feature extraction or ML inference data service or ML data service.

In another example, the network entity may transmit, to the sensor device or the UE, an acceptance to establish the ML data service based on the request, the acceptance including at least one of ML training host information or ML inference host information.

In another example, the network entity may transmit, to the sensor device or the UE, an acceptance to establish the ML data service via an RRC setup message or an RRC configuration message.

At 1704, the network entity may establish, with the sensor device or the UE, the ML data service based on the request, such as described in connection with FIGS. 10 and 11. For example, at 1038, the base station 1006 may establish, with the sensor data collector 1004, a PDU session for the ML data service based on the ML data service request. The establishment of the ML data service may be performed by, e.g., the ML data service establishment component 1842, the transmission component 1834, and/or the reception component 1830 of the apparatus 1802 in FIG. 18.

At 1706, the network entity may receive, from the sensor device, ML data including a set of features extracted from at least one sensor of the sensor device or information indicative of at least one beam for the ML data service, such as described in connection with FIGS. 10 and 11. For example, at 1044, the base station 1006 may receive, from the sensor data collector 1004, ML inference data including a set of features extracted from sensor(s) of the sensor data collector 1004 or information indicative of at least one beam for the ML data service. The reception of the ML data may be performed by, e.g., the ML data process component 1844 and/or the reception component 1830 of the apparatus 1802 in FIG. 18.

In one example, the information indicative of the at least one beam may include at least one of: a beam measurement for the at least one beam, an AoA measurement for the at least one beam, an AoD measurement for the at least one beam, a QCL or TCI state for the at least one beam, or one or more candidate beams for communicating with the network entity.

At 1708, the network entity may transmit, to the UE, a beam indication to modify the at least one beam based at least in part on the ML data received from the sensor device during the ML data service, such as described in connection with FIGS. 10 and 11. For example, at 1050, the base station 1006 may transmit, to the UE 1002, a beam indication to modify at least one beam of the UE based at least in part on the ML inference data received from the sensor data collector 1004 during the ML data service. The transmission of the beam indication may be performed by, e.g., the beam indication component 1846 and/or the transmission component 1834 of the apparatus 1802 in FIG. 18.

In one example, the beam indication may be transmitted via an RRC message for reconfiguration, a MAC-CE for activation, or DCI for signaling.

In another example, the network entity may determine whether to modify the at least one beam based on a beam prediction from an inference host.

Figure 18:
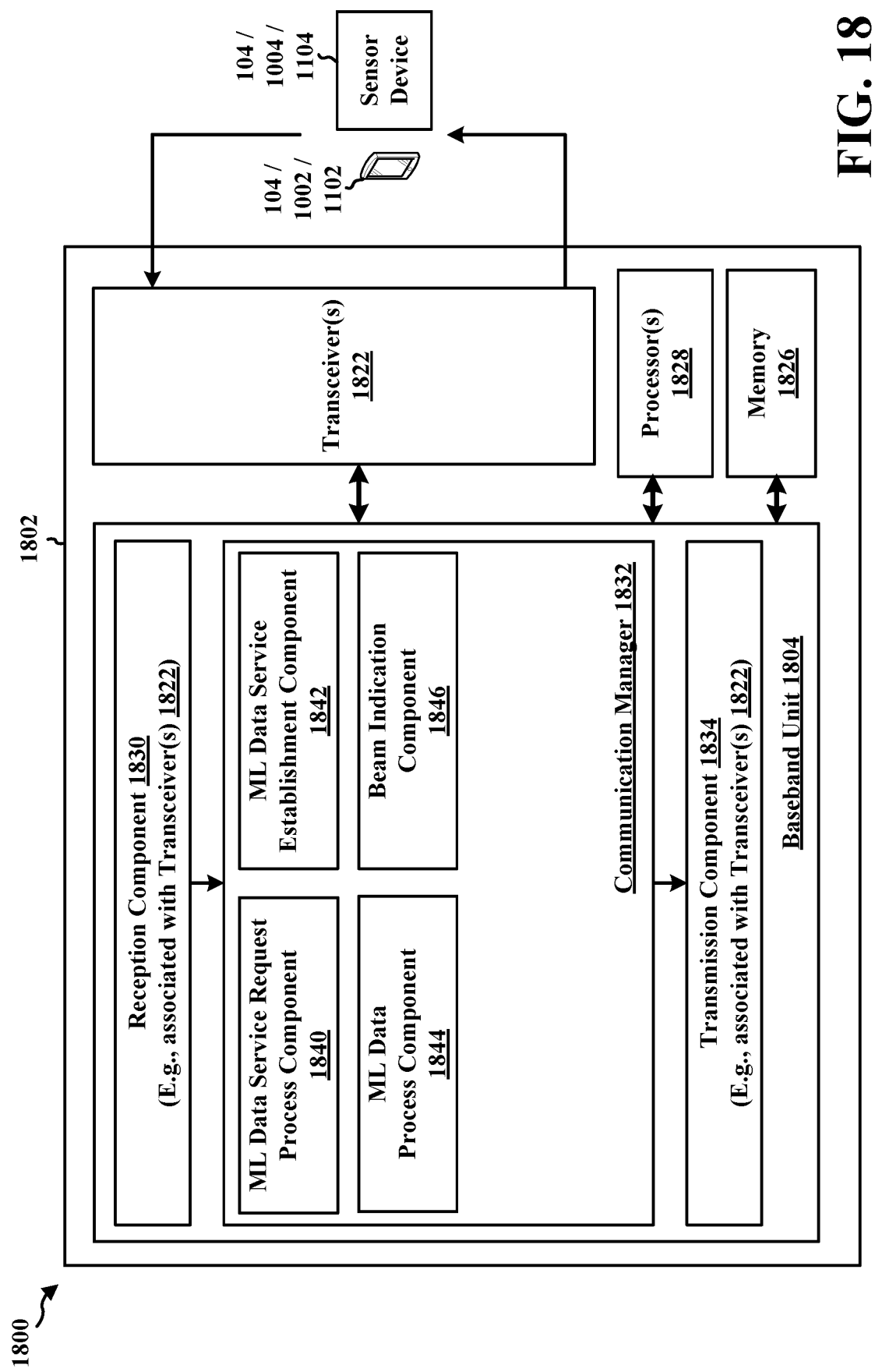
FIG. 18 is a diagram illustrating an example of a hardware implementation for an example apparatus in accordance with various aspects of the present disclosure.

FIG. 18 is a diagram 1800 illustrating an example of a hardware implementation for an apparatus 1802. The apparatus 1802 may be a network entity (e.g., a RAN, a base station, etc.), a component of a network entity, or may implement network entity functionality. In some aspects, the apparatus 1802 may include a baseband unit 1804. The baseband unit 1804 may communicate through at least one transceiver 1822 (e.g., one or more RF transceivers and/or antennas) with the UE 104 (e.g., the UE 1002, 1102; the sensor data collector 1004, 1104). The at least one transceiver 1822 may be associated with or include a reception component 1830 and/or a transmission component 1834. The baseband unit 1804 may include a computer-readable medium/memory (e.g., a memory 1826). The baseband unit 1804 and/or the at least one processor 1828 may be responsible for general processing, including the execution of software stored on the computer-readable medium/memory. The software, when executed by the baseband unit 1804 and/or the at least one processor 1828, causes the baseband unit 1804 and/or the at least one processor 1828 to perform the various functions described supra. The computer-readable medium/memory may also be used for storing data that is manipulated by the baseband unit 1804 when executing software. The baseband unit 1804 further includes the reception component 1830, a communication manager 1832, and the transmission component 1834. The reception component 1830 and the transmission component 1834 may, in a non-limiting example, include at least one transceiver and/or at least one antenna subsystem. The communication manager 1832 includes the one or more illustrated components. The components within the communication manager 1832 may be stored in the computer-readable medium/memory and/or configured as hardware within the baseband unit 1804. The baseband unit 1804 may be a component of the RF sensing node and may include the memory 376 and/or at least one of the TX processor 316, the RX processor 370, and the controller/processor 375.

The communication manager 1832 includes an ML data service request process component 1840 that is configured to receive, from a sensor device or a UE, a request for an ML data service, e.g., as described in connection with 1702 of FIG. 17. The communication manager 1832 further includes an ML data service establishment component 1842 that that is configured to establish, with the sensor device or the UE, the ML data service based on the request, e.g., as described in connection with 1704 of FIG. 17. The communication manager 1832 further includes an ML data process component 1844 that that is configured to receive, from the sensor device, ML data including a set of features extracted from at least one sensor of the sensor device or information indicative of at least one beam for the ML data service, e.g., as described in connection with 1706 of FIG. 17. The communication manager 1832 further includes a beam indication component 1846 that that is configured to transmit, to the UE, a beam indication to modify the at least one beam based at least in part on the ML data received from the sensor device during the ML data service, e.g., as described in connection with 1708 of FIG. 17.

The apparatus may include additional components that perform each of the blocks of the algorithm in the flowchart of FIG. 17. As such, each block in the flowchart of FIG. 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1802 may include a variety of components configured for various functions. In one configuration, the apparatus 1802, and in particular the baseband unit 1804, includes means for receiving, from a sensor device or a user equipment (UE), a request for a machine learning (ML) data service (e.g., the ML data service request process component 1840 and/or the reception component 1830). The apparatus 1802 includes means for establishing, with the sensor device or the UE, the ML data service based on the request (e.g., the ML data service establishment component 1842, the transmission component 1834, and/or the reception component 1830). The apparatus 1802 includes means for receive, from the sensor device, ML data including a set of features extracted from at least one sensor of the sensor device or information indicative of at least one beam for the ML data service (e.g., the ML data process component 1844 and/or the reception component 1830). The apparatus 1802 includes means for transmitting, to the UE, a beam indication to modify the at least one beam based at least in part on the ML data received from the sensor device during the ML data service (e.g., the beam indication component 1846 and/or the transmission component 1834).

In one configuration, the apparatus 1802 includes means for establishing, with the sensor device, an RRC connection if the sensor device is in an RRC idle mode or an inactive mode.

In another configuration, the request for the ML data service may include a first information associated with at least an ML model for feature extraction, an ML training data service, an ML inference data service, or a second information associated with the at least one sensor or the set of features extracted from the at least one sensor.

In another configuration, the request for the ML data service may be received via an RRC setup request message from the sensor device or a UE information message from the sensor device or the UE.

In another configuration, the network entity may be a RAN that includes at least one of: a base station, a CU of the base station, a DU of the base station, an RU of the base station, an ML training host, or an ML inference host.

In another configuration, the request for the ML data service may include information associated with at least an ML model for feature extraction or ML inference data service or ML training data service.

In another configuration, the apparatus 1802 includes means for transmitting, to the sensor device or the UE, an acceptance to establish the ML data service based on the request, the acceptance including at least one of ML training host information or ML inference host information.

In another configuration, the apparatus 1802 includes means for transmitting, to the sensor device or the UE, an acceptance to establish the ML data service via an RRC setup message or an RRC configuration message.

In another configuration, the information indicative of the at least one beam may include at least one of: a beam measurement for the at least one beam, an AoA measurement for the at least one beam, an AoD measurement for the at least one beam, a QCL or TCI state for the at least one beam, or one or more candidate beams for communicating with the network entity.

In another configuration, the beam indication may be transmitted via an RRC message for reconfiguration, a MAC-CE for activation, or DCI for signaling.

In another configuration, the apparatus 1802 includes means for determining whether to modify the at least one beam based on a beam prediction from an inference host.

The means may be one or more of the components of the apparatus 1802 configured to perform the functions recited by the means. As described supra, the apparatus 1802 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one sensor, and at least one processor coupled to a memory and configured to: receive, from a UE communicating with a network entity, a first indication for an ML data service, the ML data service being associated with at least one of an ML training data service or an ML inference data service; transmit, to the network entity, a request for the ML data service based at least in part on the first indication; establish, with the network entity, the ML data service based on the request; and transmit, to the network entity, ML data including a set of features extracted from the at least one sensor or information indicative of at least one beam for the ML data service.

Aspect 2 is the apparatus of aspect 1, where the first indication includes at least one of: UE information including a UE ID or a device ID, or the request for the ML data service that includes the ML training data service or the ML inference data service or both.

Aspect 3 is the apparatus of any of aspects 1 and 2, where the information indicative of the at least one beam includes at least one of: a beam measurement for the at least one beam, an AoA measurement for the at least one beam, an AoD measurement for the at least one beam, a QCL or TCI state for the at least one beam, or one or more candidate beams for communicating with the network entity.

Aspect 4 is the apparatus of any of aspects 1 to 3, where the information indicative of the at least one beam further includes at least one of an orientation of the sensor device or the UE, a direction of the sensor device or the UE, a speed of the sensor device or the UE, or a location of the sensor device or the UE.

Aspect 5 is the apparatus of any of aspects 1 to 4, where the information indicative of the at least one beam is received via at least one of SL communications: Bluetooth communication, Wi-Fi communication, or PC-5 communication.

Aspect 6 is the apparatus of any of aspects 1 to 5, where the network entity is a RAN that includes at least one of: a base station, a CU of the base station, a DU of the base station, or an RU of the base station, an ML training host, or an ML inference host.

Aspect 7 is the apparatus of any of aspects 1 to 6, where the ML inference host includes at least an ML inference model for beam prediction based at least in part on the ML inference data.

Aspect 8 is the apparatus of any of aspects 1 to 7, where the request for the ML data service includes a first information associated with at least an ML model for feature extraction, the ML training data service, the ML inference data service, or a second information associated with the at least one sensor or the set of features extracted from the at least one sensor.

Aspect 9 is the apparatus of any of aspects 1 to 8, where the request for the ML data service is transmitted to the network entity via an RRC message that includes at least one of: an RRC setup request message, a UE information message, or a UE assistance information message.

Aspect 10 is the apparatus of any of aspects 1 to 9, where the at least one processor is further configured to: receive, from the network entity, an acceptance to establish the ML data service via an RRC setup message or an RRC configuration message.

Aspect 11 is the apparatus of any of aspects 1 to 10, where the at least one processor is further configured to: transmit, to the UE, a second indication for the establishment of the ML data service base on the first indication; receive, from the UE, an acknowledgement for the establishment of the ML data service based on the second indication; and receive, from the UE, additional beam information for the ML data service, where the at least one beam is modified further based on the additional beam information.

Aspect 12 is the apparatus of any of aspects 1 to 11, where the at least one sensor includes: a camera, a radar sensor, a lidar sensor, or a distance sensor.

Aspect 13 is a method of wireless communication for implementing any of aspects 1 to 12.

Aspect 14 is an apparatus for wireless communication including means for implementing any of aspects 1 to 12.

Aspect 15 is a computer-readable medium storing computer executable code, where the code when executed by a processor causes the processor to implement any of aspects 1 to 12.

Aspect 16 is an apparatus for wireless communication including at least one processor coupled to a memory and configured to: receive, from a sensor device including at least one sensor, a first indication for an ML data service, the ML data service being associated with at least one of an ML training data service or an ML inference data service; transmit, to a network entity communicating with the UE, a request for the ML data service based at least in part on the indication; receive, from the network entity, an acceptance to establish the ML data service based on the request; transmit, to the sensor device, information indicative of at least one beam for the ML data service; and receive, from the network entity, a beam indication to modify the at least one beam during the ML data service.

Aspect 17 is the apparatus of aspect 16, where the first indication includes at least one of: UE information including a UE ID or a device ID, or the request for the ML data service that includes the ML training data service or the ML inference data service or both.

Aspect 18 is the apparatus of any of aspects 16 and 17, where the first indication is received via at least one of SL direct communications: Bluetooth communication, Wi-F1 communication, or PC-5 communication.

Aspect 19 is the apparatus of any of aspects 16 to 18, where the network entity is a RAN that includes at least one of: a base station, a CU of the base station, a DU of the base station, an RU of the base station, an ML training host, or an ML inference host.

Aspect 20 is the apparatus of any of aspects 16 to 19, where the request for the ML data service includes a first information associated with at least an ML model for feature extraction, the ML training data service, the ML inference data service, or a second information associated with the at least one sensor or a set of features extracted from the at least one sensor, and the request is transmitted to the network entity via a UE information message or a UE assistance information message, and where the acceptance to establish the ML data service is received via an RRC configuration message.

Aspect 21 is the apparatus of any of aspects 16 to 20, where the information indicative of the at least one beam includes at least one of: a beam measurement for the at least one beam, an AoA measurement for the at least one beam, an AoD measurement for the at least one beam, a QCL or TCI state for the at least one beam, or one or more candidate beams for communicating with the network entity.

Aspect 22 is the apparatus of any of aspects 16 to 21, where the at least one processor is further configured to: transmit, to the sensor device, a second indication for the establishment of the ML data service based on the first indication; receive, from the sensor device, an acknowledgement for the establishment of the ML data service based on the second indication; and transmit, to the sensor device, additional beam information for the ML data service, where the beam indication is further based on the additional beam information.

Aspect 23 is the apparatus of any of aspects 16 to 22, where the at least one sensor includes: a camera, a radar sensor, a light detection and ranging sensor, or a distance sensor.

Aspect 24 is the apparatus of any of aspects 16 to 23, where the beam indication is received via an RRC message for reconfiguration, a MAC-CE for activation, or DCI for signaling.

Aspect 25 is a method of wireless communication for implementing any of aspects 16 to 24.

Aspect 26 is an apparatus for wireless communication including means for implementing any of aspects 16 to 24.

Aspect 27 is a computer-readable medium storing computer executable code, where the code when executed by a processor causes the processor to implement any of aspects 16 to 24.

Aspect 28 is an apparatus for wireless communication including at least one processor coupled to a memory and configured to: receive, from a sensor device or a UE, a request for an ML data service; establish, with the sensor device or the UE, the ML data service based on the request; receive, from the sensor device, ML data including a set of features extracted from at least one sensor of the sensor device or information indicative of at least one beam for the ML data service; and transmit, to the UE, a beam indication to modify the at least one beam based at least in part on the ML data received from the sensor device during the ML data service.

Aspect 29 is the apparatus of aspect 28, where the at least one processor is further configured to: transmit, to the sensor device or the UE, an acceptance to establish the ML data service based on the request.

Aspect 30 is the apparatus of any of aspects 28 and 29, where the acceptance includes at least one of ML training host information or ML inference host information.

Aspect 31 is the apparatus of any of aspects 28 to 30, where the network entity is a RAN that includes at least one of: a base station, a CU of the base station, a DU of the base station, an RU of the base station, an ML training host, or an ML inference host.

Aspect 32 is the apparatus of any of aspects 28 to 31, where the request for the ML data service includes a first information associated with at least an ML model for feature extraction, an ML training data service, an ML inference data service, or a second information associated with the at least one sensor or the set of features extracted from the at least one sensor.

Aspect 33 is the apparatus of any of aspects 28 to 32, where the request for the ML data service is received via an RRC setup request message from the sensor device or a UE information message from the sensor device or the UE.

Aspect 34 is the apparatus of any of aspects 28 to 33, where the at least one processor is further configured to:

transmit, to the sensor device or the UE, an acceptance to establish the ML data service via an RRC setup message or an RRC configuration message.

Aspect 35 is the apparatus of any of aspects 28 to 34, where the at least one processor is further configured to: establish, with the sensor device, an RRC connection if the sensor device is in an RRC idle mode or an inactive mode.

Aspect 36 is the apparatus of any of aspects 28 to 35, where the beam indication is transmitted via an RRC message for reconfiguration, a MAC-CE for activation, or DCI for signaling.

Aspect 37 is the apparatus of any of aspects 28 to 36, where the at least one processor is further configured to: determine whether to modify the at least one beam based on a beam prediction from an inference host.

Aspect 38 is a method of wireless communication for implementing any of aspects 28 to 37.

Aspect 39 is an apparatus for wireless communication including means for implementing any of aspects 28 to 37.

Aspect 40 is a computer-readable medium storing computer executable code, where the code when executed by a processor causes the processor to implement any of aspects 28 to 37.

What is claimed is:

1. An apparatus for wireless communication at a sensor device, comprising:
   at least one sensor;
   at least one memory; and
   at least one processor coupled to the at least one memory and the at least one sensor and configured to:
      receive, from a user equipment (UE) communicating with a network entity, a first indication for a machine learning (ML) data service, the ML data service being associated with at least one of an ML training data service or an ML inference data service;
      transmit, to the network entity, a request for the ML data service based at least in part on the first indication;
      establish, with the network entity, the ML data service based on the request; and
      transmit, to the network entity, ML data including a set of features extracted from the at least one sensor or information indicative of at least one beam for the ML data service.

2. The apparatus of claim 1, wherein the first indication comprises at least one of:
   UE information including a UE identifier (ID) or a device ID, or
   the request for the ML data service that includes the ML training data service or the ML inference data service or both.

3. The apparatus of claim 1, wherein the information indicative of the at least one beam includes at least one of: a beam measurement for the at least one beam, an angle of arrival (AoA) measurement for the at least one beam, an angle of departure (AoD) measurement for the at least one beam, a Quasi Co Location (QCL) or transmission configuration indicator (TCI) state for the at least one beam, or one or more candidate beams for communicating with the network entity.

4. The apparatus of claim 1, wherein the information indicative of the at least one beam further includes at least one of an orientation of the sensor device or the UE, a direction of the sensor device or the UE, a speed of the sensor device or the UE, or a location of the sensor device or the UE.

5. The apparatus of claim 1, wherein the information indicative of the at least one beam is received via at least one of sidelink (SL) communications: Bluetooth communication, Wi-Fi communication, or PC-5 communication.

6. The apparatus of claim 1, wherein the network entity is a radio access network (RAN) that includes at least one of: a base station, a centralized unit (CU) of the base station, a distributed unit (DU) of the base station, or a radio unit (RU) of the base station, an ML training host, or an ML inference host.

7. The apparatus of claim 6, wherein the ML inference host includes at least an ML inference model for beam prediction based at least in part on the ML inference data.

8. The apparatus of claim 1, wherein the request for the ML data service includes a first information associated with at least an ML model for feature extraction, the ML training data service, the ML inference data service, or a second information associated with the at least one sensor or the set of features extracted from the at least one sensor.

9. The apparatus of claim 1, wherein to transmit the request for the ML data service, the at least one processor is configured to transmit the request for the ML data service to the network entity via a radio resource control (RRC) message that includes at least one of: an RRC setup request message, a UE information message, or a UE assistance information message.

10. The apparatus of claim 1, wherein the at least one processor is further configured to:
    receive, from the network entity, an acceptance to establish the ML data service via a radio resource control (RRC) setup message or an RRC configuration message.

11. The apparatus of claim 1, wherein the at least one processor is further configured to:
    transmit, to the UE, a second indication for the establishment of the ML data service base on the first indication;
    receive, from the UE, an acknowledgement for the establishment of the ML data service based on the second indication; and
    receive, from the UE, additional beam information for the ML data service, wherein the at least one beam is modified further based on the additional beam information.

12. The apparatus of claim 1, wherein the at least one sensor includes: a camera, a radar sensor, a light detection and ranging (lidar) sensor, or a distance sensor.

13. An apparatus for wireless communication at a user equipment (UE), comprising:
    at least one memory; and
    at least one processor coupled to the at least one memory and configured to:
       receive, from a sensor device comprising at least one sensor, a first indication for a machine learning (ML) data service, the ML data service being associated with at least one of an ML training data service or an ML inference data service;
       transmit, to a network entity communicating with the UE, a request for the ML data service based at least in part on the first indication;
       receive, from the network entity, an acceptance to establish the ML data service based on the request;
       transmit, to the sensor device, information indicative of at least one beam for the ML data service; and
       receive, from the network entity, a beam indication to modify the at least one beam during the ML data service.

14. The apparatus of claim 13, wherein the first indication comprises at least one of:
UE information including a UE identifier (ID) or a device ID, or
the request for the ML data service that includes the ML training data service or the ML inference data service or both.

15. The apparatus of claim 13, wherein to receive the first indication, the at least one processor is configured to receive the first indication via at least one of sidelink (SL) direct communications: Bluetooth communication, Wi-Fi communication, or PC-5 communication.

16. The apparatus of claim 13, wherein the network entity is a radio access network (RAN) that includes at least one of: a base station, a centralized unit (CU) of the base station, a distributed unit (DU) of the base station, a radio unit (RU) of the base station, an ML training host, or an ML inference host.

17. The apparatus of claim 13, wherein the request for the ML data service includes a first information associated with at least an ML model for feature extraction, the ML training data service, the ML inference data service, or a second information associated with the at least one sensor or a set of features extracted from the at least one sensor, and the request is transmitted to the network entity via a UE information message or a UE assistance information message, and wherein the acceptance to establish the ML data service is received via a radio resource control (RRC) configuration message.

18. The apparatus of claim 13, wherein the information indicative of the at least one beam includes at least one of: a beam measurement for the at least one beam, an angle of arrival (AoA) measurement for the at least one beam, an angle of departure (AoD) measurement for the at least one beam, a Quasi Co Location (QCL) or transmission configuration indicator (TCI) state for the at least one beam, or one or more candidate beams for communicating with the network entity.

19. The apparatus of claim 13, wherein the at least one processor is further configured to:
transmit, to the sensor device, a second indication for the establishment of the ML data service based on the first indication;
receive, from the sensor device, an acknowledgement for the establishment of the ML data service based on the second indication; and
transmit, to the sensor device, additional beam information for the ML data service, wherein the beam indication is further based on the additional beam information.

20. The apparatus of claim 13, wherein to receive the beam indication, the at least one processor is configured to receive the beam indication via a radio resource control (RRC) message for reconfiguration, a medium access control (MAC)-control element (MAC-CE) for activation, or downlink control information (DCI) for signaling.

21. An apparatus for wireless communication at a network entity, comprising:
at least one memory; and
at least one processor coupled to the at least one memory and configured to:
receive, from a sensor device or a user equipment (UE), a request for a machine learning (ML) data service;
establish, with the sensor device or the UE, the ML data service based on the request;
receive, from the sensor device, ML data including a set of features extracted from at least one sensor of the sensor device or information indicative of at least one beam for the ML data service; and
transmit, to the UE, a beam indication to modify the at least one beam based at least in part on the ML data received from the sensor device during the ML data service.

22. The apparatus of claim 21, wherein the at least one processor is further configured to:
transmit, to the sensor device or the UE, an acceptance to establish the ML data service based on the request.

23. The apparatus of claim 22, wherein the acceptance includes at least one of ML training host information or ML inference host information.

24. The apparatus of claim 21, wherein the network entity is a radio access network (RAN) that includes at least one of: a base station, a centralized unit (CU) of the base station, a distributed unit (DU) of the base station, a radio unit (RU) of the base station, an ML training host, or an ML inference host.

25. The apparatus of claim 21, wherein the request for the ML data service includes a first information associated with at least an ML model for feature extraction, an ML training data service, an ML inference data service, or a second information associated with the at least one sensor or the set of features extracted from the at least one sensor.

26. The apparatus of claim 21, wherein to receive the request for the ML data service, the at least one processor is configured to receive the request for the ML data service via a radio resource control (RRC) setup request message from the sensor device or a UE information message from the sensor device or the UE.

27. The apparatus of claim 21, wherein the at least one processor is further configured to:
transmit, to the sensor device or the UE, an acceptance to establish the ML data service via a radio resource control (RRC) setup message or an RRC configuration message.

28. The apparatus of claim 21, wherein the at least one processor is further configured to:
establish, with the sensor device, a radio resource control (RRC) connection if the sensor device is in an RRC idle mode or an inactive mode.

29. The apparatus of claim 21, wherein to transmit the beam indication, the at least one processor is configured to transmit the beam indication via a radio resource control (RRC) message for reconfiguration, a medium access control (MAC)-control element (MAC-CE) for activation, or downlink control information (DCI) for signaling.

30. The apparatus of claim 21, wherein the at least one processor is further configured to:
determine whether to modify the at least one beam based on a beam prediction from an inference host.

* * * * *